United States Patent
Wu et al.

(10) Patent No.: US 12,511,641 B2
(45) Date of Patent: Dec. 30, 2025

(54) SELECTION OF DIGITAL PROPERTIES FOR TRANSACTIONS

(71) Applicant: TBCASOFT, INC., Sunnyvale, CA (US)

(72) Inventors: William Wu, Sunnyvale, CA (US); Ling Wu, Sunnyvale, CA (US); Huan-Yi Lin, Huntington Beach, CA (US)

(73) Assignee: TBCASOFT, INC.

( * ) Notice: Subject to any disclaimer, the term of this patent is extended or adjusted under 35 U.S.C. 154(b) by 1107 days.

(21) Appl. No.: 16/644,488

(22) PCT Filed: Nov. 6, 2017

(86) PCT No.: PCT/US2017/060239
§ 371 (c)(1),
(2) Date: Mar. 4, 2020

(87) PCT Pub. No.: WO2019/050553
PCT Pub. Date: Mar. 14, 2019

(65) Prior Publication Data
US 2020/0294046 A1    Sep. 17, 2020

Related U.S. Application Data

(60) Provisional application No. 62/556,498, filed on Sep. 10, 2017.

(51) Int. Cl.
*G06Q 20/36*    (2012.01)
*G06Q 20/06*    (2012.01)
(Continued)

(52) U.S. Cl.
CPC ............. *G06Q 20/36* (2013.01); *G06Q 20/06* (2013.01); *G06Q 20/10* (2013.01); *G06Q 20/322* (2013.01);
(Continued)

(58) Field of Classification Search
CPC .............................. G06Q 20/40; G06Q 20/06
(Continued)

(56) References Cited

U.S. PATENT DOCUMENTS

2005/0268102 A1* 12/2005 Downey ............. H04L 67/1076
713/176
2015/0324789 A1    11/2015 Dvorak et al.
(Continued)

OTHER PUBLICATIONS

International Search Report and Written Opinion mailed on Jan. 22, 2018 in International Patent Application No. PCT/US2017/060239, filed on Nov. 6, 2017.

*Primary Examiner* — John W Hayes
*Assistant Examiner* — Cristina Owen Sherr
(74) *Attorney, Agent, or Firm* — Huan-Yi Lin

(57) ABSTRACT

The present disclosure concerns methods and systems for storing and selecting digital property pieces from and for a transaction, and for managing the changes from a transaction, based on cryptographic technology in a digital property management system, in order to improve the throughput and performance of the system. The digital property management system can define and maintain a plurality of bins for storing digital property pieces in memory. After receiving a transaction request at a transaction value, the digital property management system can determine a transaction bin, from which digital property pieces can be selected for a transaction.

26 Claims, 23 Drawing Sheets

| Status indicator | 1 | 1 | 1 | 0 | 1 | 1 | 1 | 0 | 1 | ...... | 1 |
|---|---|---|---|---|---|---|---|---|---|---|---|
| DPP values | 1, 1.65 | 2, 3.5 | 4, 6, 7.8 | | 18, 20, 31 | 49, 62 | 64, 100, 127 | | 234 | ...... | 1,000,000 |
| Bin number | 0 | 1 | 2 | 3 | 4 | 5 | 6 | 7 | 8 | ...... | 19 |

| Status indicator | 0 | ...... | 1 | 2 | 2 | 2 | 2 | 1 | 3 | 2 | ...... |
|---|---|---|---|---|---|---|---|---|---|---|---|
| DPP values | | ...... | 100 | 165, 200 | 350, 400 | 600, 780 | 1800, 2000 | 3100 | 4900, 6200, 6400 | 10,000, 12,700 | ...... |
| Bin number | 0 | ...... | 6 | 7 | 8 | 9 | 10 | 11 | 12 | 13 | ...... |

(51) Int. Cl.
*G06Q 20/10* (2012.01)
*G06Q 20/32* (2012.01)
*G06Q 20/38* (2012.01)
*G06Q 20/40* (2012.01)
*G06Q 30/06* (2023.01)
*H04L 67/00* (2022.01)

(52) U.S. Cl.
CPC .............. *G06Q 20/38* (2013.01); *G06Q 20/40* (2013.01); *G06Q 30/06* (2013.01); *H04L 67/00* (2013.01)

(58) Field of Classification Search
USPC .......................................................... 705/50
See application file for complete search history.

(56) References Cited

U.S. PATENT DOCUMENTS

| | | |
|---|---|---|
| 2016/0260091 A1* | 9/2016 | Tobias ............... G06Q 20/3678 |
| 2016/0283941 A1 | 9/2016 | Andrade |
| 2016/0292672 A1 | 10/2016 | Fay et al. |
| 2016/0321654 A1* | 11/2016 | Lesavich ............... H04L 67/104 |
| 2017/0005804 A1 | 1/2017 | Zinder |
| 2017/0091726 A1 | 3/2017 | Morgan et al. |
| 2017/0109735 A1 | 4/2017 | Sheng et al. |

* cited by examiner

| Status indicator | 1 | 1 | 1 | 0 | 1 | 1 | 1 | 1 | ...... | 1 |
|---|---|---|---|---|---|---|---|---|---|---|
| DPP values | 1, 1.65 | 2, 3.5 | 4, 6, 7.8 |  | 18, 20, 31 | 49, 62 | 64, 100, 127 | 234 | ...... | 1,000,000 |
| Bin number | 0 | 1 | 2 | 3 | 4 | 5 | 6 | 7 | ...... | 19 |

FIG. 1A

| Status indicator | 0 | ...... | 1 | 2 | 2 | 2 | 2 | 1 | 3 | 2 |
|---|---|---|---|---|---|---|---|---|---|---|
| DPP values |  | ...... | 100 | 165, 200 | 350, 400 | 600, 780 | 1800, 2000 | 3100 | 4900, 6200, 6400 | 10,000, 12,700 |
| Bin number | 0 | ...... | 6 | 7 | 8 | 9 | 10 | 11 | 12 | 13 |

FIG. 1B

Transaction value = 120

| Status indicator | 2 | 2 | 2 | 0 | 2 | 2 | 2 | 1 | ...... | 1 |
|---|---|---|---|---|---|---|---|---|---|---|
| DPP values | 1, 1.65 | 2, 3.5 | 4, 6, 7.8 |  | 18, 20, 31 | 49, 62 | 64, 100 | 234 | ...... | 1,000,000 |
| Bin number | 0 | 1 | 2 | 3 | 4 | 5 | 6 | 7 | ...... | 19 |
| Removed DPP values |  |  |  |  |  |  | 127 |  |  |  |

FIG. 2

Transaction value = 120

| Status indicator | 2 | 2 | 2 | 0 | 2 | 2 | 0 | 0 | 1 | ... | 1 |
|---|---|---|---|---|---|---|---|---|---|---|---|
| DPP values | 1, 1.65 | 2, 3.5 | 4, 6, 7.8 |  | 18, 20, 31 | 49, 62 | 64, 100 |  | 234 | ..... | 1,000,000 |
| Bin number | 0 | 1 | 2 | 3 | 4 | 5 | 6 | 7 | 8 | ..... | 19 |

FIG. 3A

| Status indicator | 2 | 2 | 2 | 0 | 2 | 2 | 1 | 0 | 1 | ... | 1 |
|---|---|---|---|---|---|---|---|---|---|---|---|
| DPP values | 1, 1.65 | 2, 3.5 | 4, 6, 7.8 |  | 18, 20, 31 | 49, 62 | 64 |  | 234 | ..... | 1,000,000 |
| Bin number | 0 | 1 | 2 | 3 | 4 | 5 | 6 | 7 | 8 | ..... | 19 |
| Removed DPP values |  |  |  |  |  |  | 100 |  |  |  |  |

FIG. 3B

| Status indicator | 2 | 2 | 2 | 0 | 2 | 2 | 0 | 0 | 1 | ... | 1 |
|---|---|---|---|---|---|---|---|---|---|---|---|
| DPP values | 1, 1.65 | 2, 3.5 | 4, 6, 7.8 |  | 18, 20, 31 | 49, 62 |  |  | 234 | ..... | 1,000,000 |
| Bin number | 0 | 1 | 2 | 3 | 4 | 5 | 6 | 7 | 8 | ..... | 19 |
| Removed DPP values |  |  |  |  |  |  | 64, 100 |  |  |  |  |

Transaction value = 120

| Status indicator | 2 | 2 | 2 | 0 | 2 | 2 | 1 | 0 | 1 | ..... | 1 |
|---|---|---|---|---|---|---|---|---|---|---|---|
| DPP values | 1, 1.65 | 2, 3.5 | 4, 6, 7.8 |  | 18, 20, 31 | 49, 62 | 100 |  | 234 | ..... | 1,000,000 |
| Bin number | 0 | 1 | 2 | 3 | 4 | 5 | 6 | 7 | 8 | ..... | 19 |

FIG. 4B

| Status indicator | 2 | 2 | 2 | 0 | 2 | 2 | 1 | 0 | 0 | ..... | 1 |
|---|---|---|---|---|---|---|---|---|---|---|---|
| DPP values | 1, 1.65 | 2, 3.5 | 4, 6, 7.8 |  | 18, 20, 31 | 49, 62 | 100 |  |  | ..... | 1,000,000 |
| Bin number | 0 | 1 | 2 | 3 | 4 | 5 | 6 | 7 | 8 | ..... | 19 |
| Removed DPP values |  |  |  |  |  |  |  |  | 234 | ..... |  |

Transaction value = 120

| Status indicator | 2 | 2 | 2 | 0 | 2 | 0 | 1 | 0 | 0 | ..... | 0 |
|---|---|---|---|---|---|---|---|---|---|---|---|
| DPP values | 1, 1.65 | 2, 3.5 | 4, 6, 7.8 | | 18, 20, 31 | | 100 | | | ..... | |
| Bin number | 0 | 1 | 2 | 3 | 4 | 5 | 6 | 7 | 8 | ..... | 19 |

FIG. 5A

| Status Indicator | 2 | 2 | 2 | 0 | 2 | 0 | 0 | 0 | 0 | ..... | 0 |
|---|---|---|---|---|---|---|---|---|---|---|---|
| DPP values | 1, 1.65 | 2, 3.5 | 4, 6, 7.8 | | 18, 20, 31 | | | | | ..... | |
| Bin number | 0 | 1 | 2 | 3 | 4 | 5 | 6 | 7 | 8 | ..... | 19 |
| Removed DPP values | | | | | | | 100 | | | ..... | |

FIG. 5B

| Status indicator | 2 | 2 | 2 | 0 | 1 | 0 | 0 | 0 | 0 | ..... | 0 |
|---|---|---|---|---|---|---|---|---|---|---|---|
| DPP values | 1, 1.65 | 2, 3.5 | 4, 6, 7.8 | | 31 | | | | | ..... | |
| Bin number | 0 | 1 | 2 | 3 | 4 | 5 | 6 | 7 | 8 | ..... | 19 |
| Removed DPP values | | | | | 18, 20 | | 100 | | | ..... | |

FIG. 5C

Transaction value = 6

| Status indicator | 1 | 0 | 2 | 1 | 0 | 1 | 0 | 1 | ..... | 0 |
|---|---|---|---|---|---|---|---|---|---|---|
| DPP values | 1 |  | 4, 6, 7 | 11, 12 |  | 34 |  | 175 | ..... |  |
| Bin number | 0 | 1 | 2 | 3 | 4 | 5 | 6 | 7 | ..... | 19 |

FIG. 6A

| Status indicator | 0 | 0 | 2 | 1 | 0 | 1 | 0 | 1 | ..... | 0 |
|---|---|---|---|---|---|---|---|---|---|---|
| DPP values |  |  | 4, 6 | 11, 12 |  | 34 |  | 175 | ..... |  |
| Bin number | 0 | 1 | 2 | 3 | 4 | 5 | 6 | 7 | ..... | 19 |
| Removed DPP values | 1 |  | 7 |  |  |  |  |  |  |  |

FIG. 6B

| Status indicator | 0 | 1 | 1 | 1 | 0 | 1 | 0 | 1 | ..... | 0 |
|---|---|---|---|---|---|---|---|---|---|---|
| DPP values |  | 2 | 4, 6 | 11, 12 |  | 34 |  | 175 | ..... |  |
| Bin number | 0 | 1 | 2 | 3 | 4 | 5 | 6 | 7 | ..... | 19 |

FIG. 6C

Transaction value = 14

| Status indicator | 1 | 0 | 2 | 2 | 0 | 1 | 0 | 1 | 0 | ..... | 0 |
|---|---|---|---|---|---|---|---|---|---|---|---|
| DPP values | 1 |  | 4, 6, 7 | 11, 12 |  | 34 |  | 175 |  | ..... |  |
| Bin number | 0 | 1 | 2 | 3 | 4 | 5 | 6 | 7 | 8 | ..... | 19 |

FIG. 7A

| Status indicator | 1 | 0 | 2 | 0 | 0 | 1 | 0 | 1 | 0 | ..... | 0 |
|---|---|---|---|---|---|---|---|---|---|---|---|
| DPP values | 1 |  | 4, 6, 7 |  |  | 34 |  | 175 |  | ..... |  |
| Bin number | 0 | 1 | 2 | 3 | 4 | 5 | 6 | 7 | 8 | ..... | 19 |
| Removed DPP values |  |  |  | 11, 12 |  |  |  |  |  |  |  |

FIG. 7B

| Status indicator | 1 | 0 | 2 | 1 | 0 | 1 | 0 | 1 | 0 | ..... | 0 |
|---|---|---|---|---|---|---|---|---|---|---|---|
| DPP values | 1 |  | 4, 6, 7 | 9 |  | 34 |  | 175 |  | ..... |  |
| Bin number | 0 | 1 | 2 | 3 | 4 | 5 | 6 | 7 | 8 | ..... | 19 |

FIG. 7C

Transaction value = 35

| Status indicator | 1 | 0 | 2 | 2 | 0 | 1 | 0 | 1 | 0 | ... | 0 |
|---|---|---|---|---|---|---|---|---|---|---|---|
| DPP values | 1 |  | 4, 6, 7 | 11, 12 |  | 34 |  | 175 |  | ... |  |
| Bin number | 0 | 1 | 2 | 3 | 4 | 5 | 6 | 7 | 8 | ... | 19 |

FIG. 8A

| Status indicator | 1 | 0 | 2 | 2 | 0 | 1 | 0 | 0 | 0 | ... | 0 |
|---|---|---|---|---|---|---|---|---|---|---|---|
| DPP values | 1 |  | 4, 6, 7 | 11, 12 |  | 34 |  | 7 |  | ... |  |
| Bin number | 0 | 1 | 2 | 3 | 4 | 5 | 6 | 7 | 8 | ... | 19 |
| Removed DPP values |  |  |  |  |  |  |  | 175 |  |  |  |

FIG. 8B

| Status indicator | 1 | 0 | 2 | 2 | 0 | 1 | 2 | 0 | 0 | ... | 0 |
|---|---|---|---|---|---|---|---|---|---|---|---|
| DPP values | 1 |  | 4, 6, 7 | 11, 12 |  | 34 | 70, 70 | 7 |  | ... |  |
| Bin number | 0 | 1 | 2 | 3 | 4 | 5 | 6 | 7 | 8 | ... | 19 |

FIG. 8C

Transaction value = 61

| Status indicator | 1 | 0 | 2 | 2 | 0 | 1 | 0 | 1 | 0 | ..... | 0 |
|---|---|---|---|---|---|---|---|---|---|---|---|
| DPP values | 1 |  | 4, 6, 7 | 11, 12 |  | 34 |  | 175 |  | ..... |  |
| Bin number | 0 | 1 | 2 | 3 | 4 | 5 | 6 | 7 | 8 | ..... | 19 |

FIG. 9A

| Status indicator | 1 | 0 | 2 | 2 | 0 | 1 | 0 | 0 | 0 | ..... | 0 |
|---|---|---|---|---|---|---|---|---|---|---|---|
| DPP values | 1 |  | 4, 6, 7 | 11, 12 |  | 34 |  | 7 |  | ..... |  |
| Bin number | 0 | 1 | 2 | 3 | 4 | 5 | 6 | 7 | 8 | ..... | 19 |
| Removed DPP values |  |  |  |  |  |  |  | 175 |  |  |  |

FIG. 9B

| Status indicator | 1 | 0 | 2 | 2 | 0 | 2 | 0 | 0 | 0 | ..... | 0 |
|---|---|---|---|---|---|---|---|---|---|---|---|
| DPP values | 1 |  | 4, 6, 7 | 11, 12 |  | 34, 57, 57 |  | 7 |  | ..... |  |
| Bin number | 0 | 1 | 2 | 3 | 4 | 5 | 6 | 7 | 8 | ..... | 19 |

FIG. 9C

First subtransaction: Transfer 50 $USD.ATT from William's virtual wallet to ATT's virtual treasury William's virtual wallet (before the transaction)

| Status indicator of $USD.ATT | 1 | 1 | 2 | 2 | 0 | 2 | 2 | 0 | ...... | 0 |
|---|---|---|---|---|---|---|---|---|---|---|
| UTXO values of $USD.ATT |  | 3.5, 2.76 | 5, 7.6, 4.4 | 7, 4, 6 | 11, 12 |  | 48, 58 | 175, 244 | ...... |  |
| Bin number | 0 | 1 | 2 | 3 | 4 | 5 | 6 | 7 | ...... | 19 |

FIG. 13A

ATT's virtual treasury (before the transaction)

| Status indicator of $USD.ATT | 1 | 1 | 0 | 2 | 0 | 0 | 2 | 2 | ...... | 0 |
|---|---|---|---|---|---|---|---|---|---|---|
| UTXO values of $USD.ATT |  | 5, 7.6, 4.4 |  | 31, 24, 18.97, 22 |  |  | 104, 79, 110.32 | 331 | ...... |  |
| Status indicator of $USD.FET | 0 | 0 | 0 | 0 | 0 | 1 | 1 | 0 | ...... | 0 |
| UTXO values of $USD.FET |  |  |  |  |  | 36 | 214 |  | ...... |  |
| Bin number | 0 | 1 | 2 | 3 | 4 | 5 | 6 | 7 | ...... | 19 |

FIG. 13B

FET's virtual treasury (before the transaction)

| | | | | | | | | | | |
|---|---|---|---|---|---|---|---|---|---|---|
| Status indicator of $USD.ATT | 0 | 0 | 2 | 0 | 0 | 0 | 1 | 0 | ...... | 0 |
| UTXO values of $USD.ATT | | 5.65 | 10, 8.5 | | | | 88 | | ...... | |
| Status indicator of $USD.FET | 1 | 1 | 1 | 2 | 0 | 2 | 0 | 0 | ...... | 0 |
| UTXO values of $USD.FET | 3.12 | 4, 6, 6, 7 | 8 | | | 55, 38 | | 444, 333 | ...... | |
| Bin number | 0 | 1 | 2 | 3 | 4 | 5 | 6 | 7 | ...... | 19 |

FIG. 13C

Steve's virtual wallet (before the transaction)

| | | | | | | | | | | |
|---|---|---|---|---|---|---|---|---|---|---|
| Status indicator of $USD.FET | 1 | 1 | 0 | 1 | 2 | 0 | 2 | 0 | ...... | 0 |
| UTXO values of $USD.FET | | | 14 | 25, 32 | | 101, 126 | | 500 | ...... | |
| Bin number | 0 | 1 | 2 | 3 | 4 | 5 | 6 | 7 | ...... | 19 |

FIG. 13D

Second subtransaction: Transfer 50 $USD.FET from ATT's virtual treasury to FET's virtual treasury William's virtual wallet (after first subtransaction)

| Status indicator of $USD.ATT | UTXO values of $USD.ATT | Bin number | Removed UTXO values of $USD.ATT |
|---|---|---|---|
| 1 | 1 | 0 | |
| 0 | | 1 | |
| 2 | 7, 4, 6 | 2 | |
| 2 | 11, 12 | 3 | |
| 0 | | 4 | |
| 1 | 56 | 5 | 48, 58 |
| 0 | | 6 | |
| 2 | 175, 244 | 7 | |
| 0 | | 8 | |
| ..... | ..... | ..... | ..... |
| 0 | | 19 | |

FIG. 14A

ATT's virtual treasury (after first subtransaction)

| Status indicator of $USD.ATT | UTXO values of $USD.ATT | Status indicator of $USD.FET | UTXO values of $USD.FET | Bin number |
|---|---|---|---|---|
| 1 | 1 | 0 | | 0 |
| 2 | 3.5, 2.76 | 0 | | 1 |
| 2 | 5, 7.6, 4.4 | 0 | | 2 |
| 0 | | 0 | | 3 |
| 2 | 31, 24, 18.97, 22 | 0 | | 4 |
| 1 | 50 | 1 | 36 | 5 |
| 2 | 104, 79, 110.32 | 0 | | 6 |
| 0 | | 1 | 214 | 7 |
| 1 | 331 | 0 | | 8 |
| ..... | ..... | ..... | ..... | ..... |
| 0 | | 0 | | 19 |

FIG. 14B

FET's virtual treasury (after first subtransaction)

| Status indicator of $USD.ATT | 0 | 0 | 1 | 2 | 0 | 0 | 0 | 0 | ... | 0 |
|---|---|---|---|---|---|---|---|---|---|---|
| UTXO values of $USD.ATT | | | 5.65 | 10, 8.5 | | | 88 | | ... | |
| Status indicator of $USD.FET | 1 | 1 | 2 | 1 | 0 | 2 | 0 | 0 | ... | 2 |
| UTXO values of $USD.FET | | 3.12 | 4, 6, 6, 7 | 8 | | 55, 38 | | | ... | 444, 333 |
| Bin number | 0 | 1 | 2 | 3 | 4 | 5 | 6 | 7 | ... | 19 |

FIG. 14C

Steve's virtual wallet (after first subtransaction)

| Status indicator of $USD.FET | 1 | 1 | 0 | 2 | 0 | 2 | 0 | 1 | ... | 0 |
|---|---|---|---|---|---|---|---|---|---|---|
| UTXO values of $USD.FET | | | 14 | 25, 32 | | 101, 126 | | 500 | ... | |
| Bin number | 0 | 1 | 2 | 3 | 4 | 5 | 6 | 7 | ... | 19 |

FIG. 14D

Third subtransaction: Transfer 50 $USD.FET from FET's virtual treasury to Steve's virtual wallet William's virtual wallet (after second subtransaction)

| Status indicator of $USD.ATT | UTXO values of $USD.ATT | Bin number |
|---|---|---|
| 1 | 1 | 0 |
| 0 |  | 1 |
| 2 | 7, 4, 6 | 2 |
| 2 | 11, 12 | 3 |
| 0 |  | 4 |
| 1 | 56 | 5 |
| 0 |  | 6 |
| 2 | 175, 244 | 7 |
| 0 |  | 8 |
| ... | ... | ... |
| 0 |  | 19 |

FIG. 15A

ATT's virtual treasury (after second subtransaction)

| Status indicator of $USD.ATT | UTXO values of $USD.ATT | Status indicator of $USD.FET | UTXO values of $USD.FET | Bin number | Removed UTXO values of $USD.FET |
|---|---|---|---|---|---|
| 1 | 3.5, 2.76 | 0 |  | 0 |  |
| 2 | 5, 7.6, 4.4 | 0 |  | 1 |  |
| 0 |  | 2 | 31, 24, 18.97, 22 | 2 |  |
| 0 |  | 0 |  | 3 |  |
| 1 | 50 | 2 | 104, 79, 110.32 | 4 |  |
| 1 | 36 | 1 | 331 | 5 |  |
| 0 |  | 2 | 82, 82 | 6 | 214 |
| 0 |  | 0 |  | 7 |  |
| 0 |  | 0 |  | 8 |  |
| ... | ... | ... | ... | ... |  |
| 0 |  | 0 |  | 19 |  |

FIG. 15B

FET's virtual treasury (after second subtransaction)

| Status indicator of $USD.ATT | 0 | 0 | 2 | 0 | 0 | 0 | 1 | 0 | 0 | ..... | 0 |
|---|---|---|---|---|---|---|---|---|---|---|---|
| UTXO values of $USD.ATT | | 5.65 | 10, 8.5 | | | | 88 | | | ..... | |
| Status indicator of $USD.FET | 1 | 2 | 1 | | 0 | 2 | 0 | 2 | 0 | ..... | 0 |
| UTXO values of $USD.FET | 3.12 | 4, 6, 6, 7 | 8 | | | 55, 38, 50 | | 444, 333 | | ..... | |
| Bin number | 0 | 1 | 2 | 3 | 4 | 5 | 6 | 7 | 8 | ..... | 19 |

FIG. 15C

Steve's virtual wallet (after second subtransaction)

| Status indicator of $USD.FET | 1 | 1 | 0 | 0 | 2 | 0 | 2 | 0 | 1 | ..... | 0 |
|---|---|---|---|---|---|---|---|---|---|---|---|
| UTXO values of $USD.FET | | | | 14 | 25, 32 | | 101, 126 | | 500 | ..... | |
| Bin number | 0 | 1 | 2 | 3 | 4 | 5 | 6 | 7 | 8 | ..... | 19 |

FIG. 15D

William's virtual wallet (after third subtransaction)

| Status indicator of $USD.ATT | 1 | 1 | 0 | 2 | 0 | 1 | 0 | 2 | 0 | ..... | 0 |
|---|---|---|---|---|---|---|---|---|---|---|---|
| UTXO values of $USD.ATT | | 7, 4, 6 | | 11, 12 | | 56 | | 175, 244 | | ..... | |
| Bin number | 0 | 1 | 2 | 3 | 4 | 5 | 6 | 7 | 8 | ..... | 19 |

FIG. 16A

ATT's virtual treasury (after third subtransaction)

| Status indicator of $USD.ATT | 1 | 1 | 0 | 1 | 1 | 1 | 0 | 1 | 0 | ..... | 0 |
|---|---|---|---|---|---|---|---|---|---|---|---|
| UTXO values of $USD.ATT | 3.5, 2.76 | 5, 7.6, 4.4 | | 31, 24, 18.97, 22 | 50 | 104, 79, 110.32 | | 331 | | ..... | |
| Status indicator of $USD.FET | 0 | 0 | 1 | 0 | 1 | 1 | 0 | 0 | 0 | ..... | 0 |
| UTXO values of $USD.FET | | | | | 36 | 82, 82 | | | | ..... | |
| Bin number | 0 | 1 | 2 | 3 | 4 | 5 | 6 | 7 | 8 | ..... | 19 |

FET's virtual treasury (after third subtransaction)

| | | | | | | | | | | | |
|---|---|---|---|---|---|---|---|---|---|---|---|
| Status indicator of $USD.ATT | 0 | 1 | 2 | 0 | 0 | 1 | 0 | 0 | 0 | ..... | 0 |
| UTXO values of $USD.ATT | | 5.65 | 10, 8.5 | | | 88 | | | | ..... | |
| Status indicator of $USD.FET | 1 | 2 | 2 | 2 | 0 | 2 | 0 | 0 | 2 | ..... | 0 |
| UTXO values of $USD.FET | | 3.12 | 6.6, 7 | 8, 9 | | 38, 50 | | | 444, 333 | ..... | |
| Bin number | 0 | 1 | 2 | 3 | 4 | 5 | 6 | 7 | 8 | ..... | 19 |
| Removed UTXO values of $USD.FET | | 4 | | | 55 | | | | | ..... | |

FIG. 16D

Steve's virtual wallet (after third subtransaction)

| | | | | | | | | | | | |
|---|---|---|---|---|---|---|---|---|---|---|---|
| Status indicator of $USD.FET | 1 | 0 | 1 | 2 | 2 | 1 | 2 | 0 | 1 | ..... | 0 |
| UTXO values of $USD.FET | | | | 14 | 25, 32 | 50 | 101, 126 | | 500 | ..... | |
| Bin number | 0 | 1 | 2 | 3 | 4 | 5 | 6 | 7 | 8 | ..... | 19 |

| Standard Transaction | | |
|---|---|---|
| 4 bytes | Version number | 1 |
| 1-9 bytes | Number of inputs contained | Positive Integer |
| Varies | Sequential list of inputs | Transaction Inputs |
| 1-9 bytes | Number of outputs contained | Positive Integer |
| Varies | Sequential list of outputs | Transaction Outputs |
| 4 bytes | Block height or timestamp when transaction is final | 0 |

FIG. 17A

| Transaction Input (Standard Transaction) | | |
|---|---|---|
| 32 bytes | Previous transaction hash | E.g:1979fe5abb7192c637cfa4c14a1e953ec0f02c54de28c8f82fc21245c0cab8ac |
| 4 bytes | Referenced output offset (0-indexed) | Non-negative integer |
| 1-9 bytes | Size of ScriptSig | Positive integer |
| Varies | ScriptSig (signature and public key to unlock) | E.g:47304422204470d5ae4624357f6b1361daac5d3aaeae5e197551fdf067f42aec5c7a5e51 f2204117b06f77809295dd385da9b96567d3dc568e87d622ee37a758c836bb136e1212e 0ac817fd21a44b43c6468d71a472e198521fcb66e36663b5a817398 6d7609f |
| 4 bytes | Sequence Number | 0xFFFFFFFF |

FIG. 17B

| | Transaction Output |
|---|---|
| 8 bytes | Value of output — Positive Integer |
| 4 bytes | FC of output (mapped to a currency such as JPY.SB) — Integer > 2 (0 and 1 are reserved) |
| 1-9 bytes | Size of ScriptPubKey — Positive integer |
| Varies | ScriptPubKey (locking script) — OP_DUP OP_HASH160 <Address> OP_EQUALVERIFY OP_CHECKSIG |

FIG. 17C

SELECTION OF DIGITAL PROPERTIES FOR TRANSACTIONS

BACKGROUND OF THE INVENTION

Field of the Invention

The present disclosure relates generally to systems, apparatuses, computer readable mediums and methods for storing and selecting digital property pieces for transactions, and for arranging changes from transactions.

Description of Related Art

A digital property management system can have different approaches to handle the value of a digital property piece and to select digital property pieces with appropriate value(s) for a transaction. Some conventional digital property management systems use decimal digital currencies. In a blockchain system such as Bitcoin, the value of a digital property piece is represented by a UTXO (unspent transaction output). A UTXO is an indivisible chunk of digital property piece locked by a private key to a specific virtual wallet and can be of any arbitrary value. A customer's virtual wallet may comprise many UTXO(s) from hundreds of prior transactions recorded in hundreds of blocks. The customer can request a transaction to transfer a specific value of the digital property to a restaurant, e.g. to pay for a meal. The transaction may comprise one or more transaction inputs (input UTXO) from the customer's virtual wallet and one or more transaction outputs (output UTXO) to receiving virtual wallets, e.g. meal value to the restaurant and the change back to the customer. Since the variance in UTXO value can span several orders of magnitude, the method of selecting appropriate UTXO(s) to complete a transaction can impact the throughput and performance of a digital property management system. In addition, if care is not taken in selecting UTXO(s) for use in a transaction, the number of UTXO(s) selected can be too large to sign (or in some cases can generate a transaction too large to even fit in a block).

Currently, some digital property management systems may first try to select a UTXO that matches the transaction value. If not available, then the system will select the smallest UTXO greater than the transaction value. If not available, the system will randomly combine smaller UTXO(s) a certain number of times until their sum is greater than or equal to the transaction value, and select the smallest combination of UTXO(s) that meets the requirement. This approach cannot be used in a digital property management system that has a large number of UTXO(s) in virtual wallets and high volume of transactions.

SUMMARY

The present disclosure is directed to a method and related apparatus and computer readable medium for storing and selecting digital property piece(s) for transactions, and for arranging changes of the transactions in a digital property management system, including a distributed transaction consensus network using cryptographic techniques to process transactions. When a blockchain is employed to record transactions in a distributed transaction consensus network, a digital property piece ("DPP") is represented by an unspent transaction output (UTXO).

A digital property management ("system") may include a digital property transaction system and the associated virtual wallets (including virtual treasuries). In order to store digital property pieces in a virtual wallet or a data structure shared between the virtual wallets and the transaction system, the digital property management system ("system") has to maintain a plurality of bins, e.g. from bin number 0, bin number 1, to bin number M. Each bin can have a pipeline structure in a memory for data storage. The system also maintains a plurality of status indicators to indicate the number of digital property pieces stored in the corresponding bins.

An object of the present disclosure is for a digital property management system to determine a designated bin number for a newly generated digital property piece, and to store it in such bin and set the corresponding status indicator accordingly, if necessary. The bin number is determined by taking the floor of the logarithm of the value of the digital property piece. The predetermined base number of the logarithm can be any number larger than 1, such as 1.5, 2, 2.8, 3, or 4.

Another object of the present disclosure is for a digital property management system to select appropriate digital property pieces for a transaction, in order to improve the transaction throughput of the system. After receiving a transaction request at a transaction value, the digital property management system will determine a target bin which a digital property at the transaction value is designated to store, by taking the floor of the logarithm of the transaction value. If the predetermined base number of the logarithm is two (2), the system generally can select two or less than two digital property pieces from the target bin to complete a transaction. If the predetermined base number of the logarithm is three (3), the system generally can select three or less than three digital property pieces from the target bin to complete a transaction.

Another object of the present disclosure is for a digital property management system to arrange an original change value so that the newly generated digital property pieces at actual change value from the transaction are stored in a bin closer to the target bin. The digital property management system can combine the original change value with an additional digital property piece from the original change bin, which a digital property piece at the original change value is designated to store, or break the original change value into two actual change values. As a result, the system will have digital property pieces with values more in demand for a transaction.

Additional features and advantages of the disclosure will be set forth in the descriptions that follow, and in part will be apparent from the descriptions, or may be learned by practice of the disclosure. The objectives and other advantages of the disclosure will be realized and attained by the structure and method particularly pointed out in the written description and claims thereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

FIG. 1A is a table illustrating an embodiment of various digital property pieces expressed in real world value, stored in bins and their corresponding status indicators of a digital property management system.

FIG. 1B is a table illustrating an embodiment of various digital property pieces expressed in converted value, stored in bins and their corresponding status indicators of a digital property management system.

FIG. 2 is a table illustrating an embodiment of a system selecting a first digital property piece from a target bin for a transaction.

FIGS. 3A-C are tables illustrating an embodiment of a system selecting a first and a second digital property pieces from a target bin for a transaction.

FIGS. 4A-B are tables illustrating an embodiment of a system selecting a digital property piece from a bin higher than a target bin for a transaction.

FIGS. 5A-C are tables illustrating an embodiment of a system selecting three digital property pieces from a target bin and a lower level bin for a transaction.

FIGS. 6A-C are tables illustrating an embodiment of a system adding an additional digital property piece to a transaction input to generate an actual change to be stored in a higher level bin than an original change bin.

FIGS. 7A-C are tables illustrating an embodiment of a system storing a change in a target bin.

FIGS. 8A-C are tables illustrating an embodiment of a system breaking an original change value into two equal actual change values to be stored in a lower level bin than an original change bin.

FIGS. 9A-C are tables illustrating another embodiment of a system breaking an original change value into two equal actual change values to be stored in a lower level bin than an original change bin.

FIGS. 13A-D are tables illustrating an embodiment of digital property pieces stored in bins before a remittance transaction.

FIGS. 14A-D are tables illustrating an embodiment of digital property pieces stored in bins after first subtransaction.

FIGS. 15A-D are tables illustrating an embodiment of digital property pieces stored in bins after second subtransaction.

FIGS. 16A-D are tables illustrating an embodiment of digital property pieces stored in bins after third subtransaction.

FIGS. 17A-C are tables illustrating an embodiment of data structure used for a remittance transaction.

DETAILED DESCRIPTION OF PREFERRED EMBODIMENTS

Figure 10:
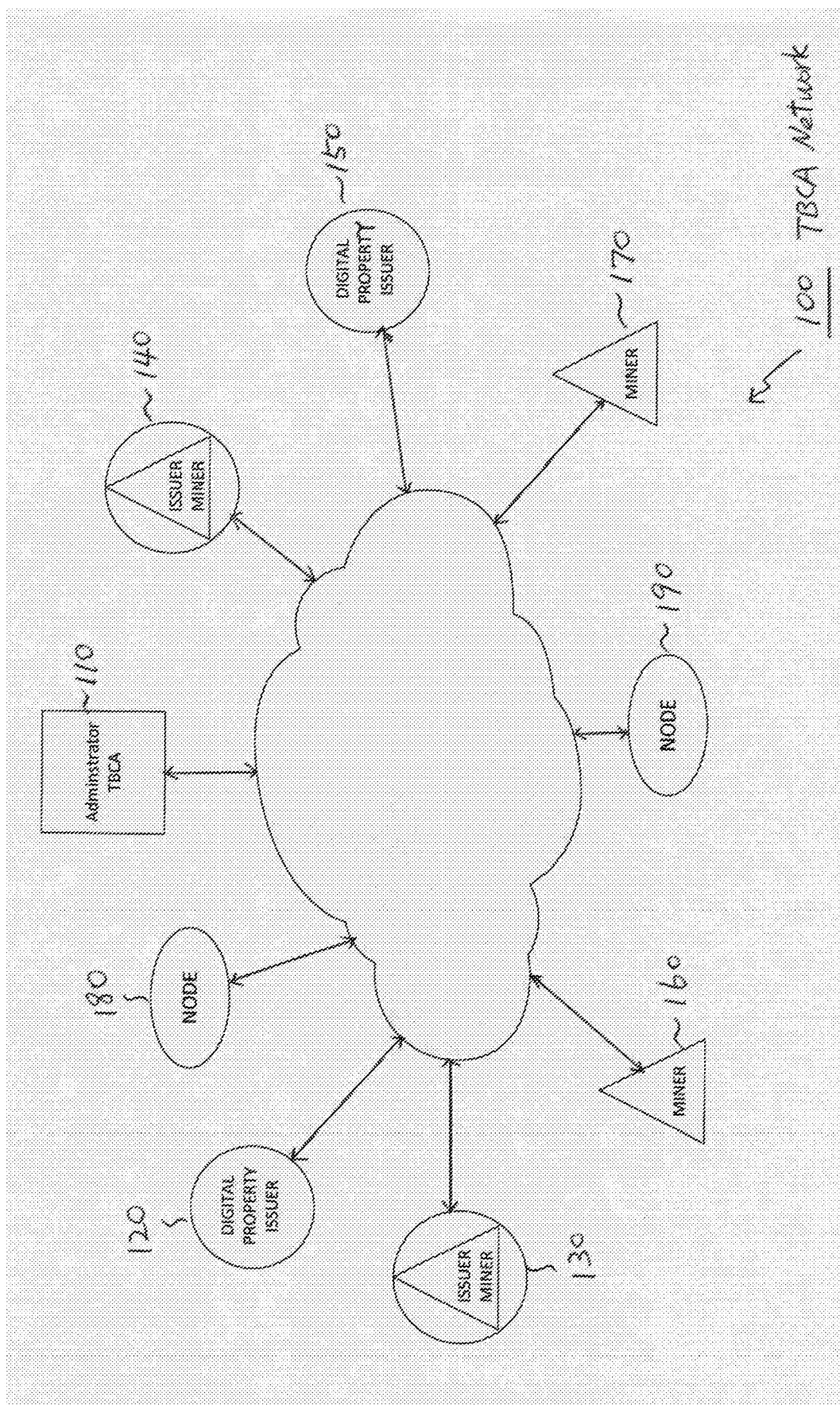
FIG. 10 is a schematic diagram illustrating a distributed transaction consensus network.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

The embodiments introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

The described embodiments concern one or more methods, systems, apparatuses, and computer readable mediums storing processor-executable process steps for storing and selecting digital property piece(s) ("DPP") from and for a transaction, and for managing the change(s) from a transaction, based on cryptographic technology in a digital property management system ("system"), in order to improve the throughput and performance of the system. In one embodiment, a digital property management system comprises a digital property transaction system, such as a distributed transaction consensus network, and the associated virtual wallets, including virtual treasuries (a special type of virtual wallets used by digital property issuers), and others. Various cryptographic algorithms known to people with ordinary skill in the art can be used.

In one embodiment, a digital property piece is used to represent an arbitrary value of a digital property in a digital property management system. Both input and output of a transaction are digital property pieces, including changes. In one embodiment, digital property pieces can be stored in a virtual wallet, including a virtual treasury. The digital property transaction system maintains a separate set of digital property pieces. Both sets of digital property pieces have to synchronize with each other. In another embodiment, digital property pieces can be stored in a data structure shared by the virtual wallets and the digital property transaction system. A virtual wallet can access digital property pieces storing in memory, which result from prior transactions.

Each digital property piece has a value which, in one embodiment, has two expressions—real world value and converted value. A real world value is a financial value recognized by the virtual wallet owner, which can be any number larger than zero (0). A converted value is a value converted from the real world value by multiplying it by a certain number to make the converted value an integer equal to or larger than one (1). For example, a real world value of 12.34 can have a converted value of 1234 derived by multiplying 12.34 by 100; and with the same conversion rate, a real world value of 0.89 has a converted value of 89 derived by multiplying 0.89 by 100. The digital property management system can determine the conversion rate based on its needs. Either a real world value or a converted value can be used in the embodiments for selecting digital property pieces for a transaction. When a converted value is employed, all the values are expressed as a converted value for selecting digital property pieces. All the digital property pieces of the same type, for example USD (US Dollar) or JPY (Japanese Yen), should use the same conversion ratio, such as 100, for their converted value. When a real world value is employed, all the values are expressed as a real world value for selecting digital property pieces. However, if a real world value of a transaction is smaller than one (1), the selection of digital property pieces for a transaction whose real world transaction value is smaller than one has to be handled separately.

In a digital property management system employing blockchain data structure for its distributed ledger to record transactions, a UTXO (unspent transaction output) is used to represent a digital property piece. International Patent Application PCT/US17/12635, filed on Jan. 6, 2017, titled "DIGI- TAL PROPERTY MANAGEMENT ON A DISTRIBUTED TRANSACTION CONSENSUS NETWORK", is incorporated herein by reference In one embodiment as shown in FIG. 1A, in order to facilitate the selection of digital property pieces for a transaction, a plurality of bins are defined for storing digital property pieces in memory. The bins are arranged in a low to high level order. For example, from bin number 0 (B_0), bin number 1 (B_1), bin number 2 (B_2), . . . to bin number M (B_M). Each bin is allocated to store digital property pieces of a value within a right-open interval from a lower limit continuously to an upper limit. In general, bin number Y can store digital property pieces with a value from $X^Y$ to less than $X^{(Y+1)}$, where X is a predetermined base number which can be any number larger than 1, and Y begins from 0 and increases by 1 for the next higher level bin. For example, if the predetermined base number X is 2, bin number 0 can store digital property pieces with a value from 1 to less than 2 where 1 is the lower limit and 2 is the upper limit of bin number 0; bin number 1 can store digital property pieces with a value from 2 to less than 4 where 2 is the lower limit and 4 is the upper limit of bin number 1; and bin number 2 can store digital property pieces with a value from 4 to less than 8 where 4 is the lower limit and 8 is the upper limit of bin number 2. The upper limit of a given bin equals to the lower limit of a next higher level bin so that each digital property piece can be stored in a designated bin. For example, the upper limit of the bin number 1 equals to the low limit of the bin number 2, both of which are 4. In addition, the upper limit of a given bin equals to its lower limit multiplied by a predetermined base number, which can be any number larger than one such as 1.5, 2, 2.4, 3, etc. In one embodiment where the predetermined base number is 2, the upper limit of a given bin equals to its lower limit multiplied by 2. For example, bin number 1 has the upper limit 2 and lower limit 1 where the upper limit 2 equals to the lower limit 1 multiplied by 2; bin number 2 has the upper limit 4 and lower limit 2 where the upper limit 4 equals to the lower limit 2 multiplied by 2.

With this arrangement, the digital property management system generally can select 2 or less than 2 digital property pieces to complete a transaction because the aggregate value of any two digital property pieces in a given bin must be larger than any transaction value in the same bin. In other words, the digital property management system needs to select at most a ceiling of base number of digital property pieces to complete a transaction. For example, if the base is 2.4 or 3, the digital property management system needs to select at most 3 digital property pieces to complete a transaction. (The ceiling of 2.4 is 3.) Once a base number is determined, the same base number should be used for all other logarithm operations in this description.

Given a largest transaction value the digital property management system intends to handle, in one embodiment, M+1 bins from bin number 0 to bin number M, are allocated for storing digital property pieces. The number M is determined by taking the floor of (the greatest integral that is the same or smaller than) the logarithm of the intended largest transaction value. For example, if the largest transaction value is 1,000,000 and base number 2 is used, the floor of base 2 logarithm of 1,000,000 is 19, which is the M number. As a result, the system allocates appropriate memory space for 20 bins, from bin number 0 (B_0) to bin number 19 (B_19), to store all digital property pieces.

For example, as shown in FIG. 1A, when a real world value expression is employed, bin number 0 can store digital property pieces with a value from 1 to less than 2, including 1, and 1.65; bin number 1 can store digital property pieces with a value from 2 to less than 4, including 2 and 3.5; bin number 2 can store digital property pieces with a value from 4 to less than 8, including 4, 6, and 7.8; bin number 4 can store digital property pieces with a value from 16 to less than 32, including 18, 20, and 31; bin number 6 can store digital property pieces with a value from 64 to less than 128, including 65, 100, and 127; and bin number 19 can store digital property pieces with a value from 524,288 to less than 1,048,576. A digital property piece whose real world value is less than 1, such as 0.2, has to be stored in a special bin, such as bin number −1. A transaction request at a real world transaction value less than 1, such as 0.98, has to be handled separately. For example, the digital property management system can select one digital property piece from bin number 0, whose real world value ranges from 1 to less than 2, or the next higher populated bin, to complete such a transaction.

In another embodiment as shown in FIG. 1B, when a converted value expression is employed, using a conversion ratio of 100 for the real world values in FIG. 1A, bin number 6 can store digital property pieces with a value from 64 to less than 128, including 100; bin number 7 can store digital property pieces with a value from 128 to less than 256, including 165 and 200; bin number 8 can store digital property pieces with a value from 256 to less than 512, including 350 and 400; bin number 9 can store digital property pieces with a value from 512 to less than 1024, including 600 and 780; and bin number 10 can store digital property pieces with a value from 1024 to less than 2048, including 1800 and 2000. In such an expression manner, the smallest converted value is 1 and no separate handling is necessary.

All digital property pieces stored in the same bin can be arranged in a specific order for selection. For example, all digital property pieces stored in the same bin are arranged in a pipeline sequence. In one embodiment, a digital property piece is selected in a first in first out order in the same bin for transactions. In another embodiment, a digital property piece is selected in a last in first out order in the same bin for transactions. In another embodiment, a digital property piece in the same bin is randomly selected for transactions.

In addition, in one embodiment as shown in FIG. 1A, to determine how many digital property pieces are stored in a specific bin, a digital property management system maintains a plurality of status indicators in memory, each of which corresponds to a bin to indicate the number of digital property pieces stored in the bin. For example, status indicator number 1 is used to indicate the number of digital property pieces stored in bin number 1 (B_1). In one embodiment as shown in FIG. 1A, a status indicator comprises one bit to indicate whether the bin stores at least one digital property piece or empty. For example, when the bin stores 1 or more digital property pieces, the corresponding status indicator is 1; when the bin is empty, the status indicator is 0. Accordingly, status indicator 2 set to 1 indicates at least one digital property piece stored in bin number 2 (B_2); and status indicator number 3 set to 0 indicates no digital property piece stored in bin number 3 (B_3). The digital property management system will set the value of the corresponding status indicator to one (1) or zero (0), whenever necessary, to indicate the correct status of a bin, once a digital property piece is taken out or stored into such bin. In another embodiment as shown in FIG. 1B, a status indicator comprises two bits to indicate whether a bin stores 0, 1, 2, or 3 (including more than 3) digital property pieces. In another embodiment as shown in FIG. 2, a status indicator can indicate whether a bin stores 0, 1, or 2 (including more than 2) digital property pieces. In one embodiment, the number of status indicators is the same as the number of bins. For example, M+1 status indicators are allocated for M+1 bins (B_0–B_M). In one embodiment, the system does not maintain a plurality of status indicators in memory. In that situation, each time the system wants to select a digital property piece from the target bin or other bin, the system can check such bin to determine whether it stores sufficient number of digital property pieces, for example 1 or 2 or more.

As mentioned before, digital property pieces can be stored in a plurality of bins in memory for selection. In one embodiment, the digital property management system maintains two sets of data structure (bins or other types of data structure) to store digital property pieces, one set in virtual wallets (including virtual treasuries) and the other set in digital property transaction system, such as blockchain in a distributed transaction consensus network. Both sets of digital property pieces have to synchronize with each other. The initial population of bins in virtual wallets can be conducted by loading the entire set of digital property pieces from the blockchain and respectively storing into proper bins based on their values. A virtual wallet can access the set of digital property pieces in the blockchain through an inter-process API (application programming interface). When a digital property piece is selected for a transaction, such digital property piece is removed from the bin and stored in a locked bin (no shown) so that it won't be selected again for another transaction. In one embodiment, the locked bin can be bin number −2. Once the transaction is completed, the digital property transaction system, such as a distributed transaction consensus network using blockchain data structure for its distributed ledger, can communicate the related information, including newly generated digital property pieces, to virtual wallets through a message queue. For example, the digital property transaction system pushes a completed transaction onto a message queue and the virtual wallet receives the information regarding the newly generated digital property pieces. As a result, the selected digital property pieces stored in the locked bin will be deleted because they are consumed by the transaction; and the newly generated digital property pieces, such as changes, will be stored in proper bins. If the transaction fails, to avoid loss, the digital property pieces stored in the locked bin have to be returned to the bins from which they are removed. In the embodiment where the predetermined base number is 2, when a virtual wallet receives a newly generated digital property piece, the digital property management system determines which bin it should go into by taking the floor of the base 2 logarithm of its value. For example, a newly generated digital property piece with value 98 should go into bin number 6, which is designated for values from 64 to less than 128. In another embodiment, one set of digital property pieces can be stored in a data structure shared by the virtual wallets and the digital property transaction system. Similar measures to prevent double use and loss (when the transaction fails) can be implemented.

After a plurality of bins are defined and digital property pieces are populated in the proper bins, to initiate the selection of digital property pieces for a transaction, a virtual wallet receives a transaction request at a transaction value T. In the following embodiments, the predetermined base number is 2. The digital property management system then determines the target bin (B_N), in which a digital property piece at the transaction value T is designated to store, by taking the floor of the base 2 logarithm of the transaction value T. Floor ($Log_2$ T)=target bin number N. In other words, the transaction value T is within the value range of the target bin number N where N is the greatest integral which is the same or smaller than the base 2 logarithm of the transaction value T. If the content of corresponding status indicator number N is 2 indicating that bin number N (B_N) stores at least two digital property pieces, the digital property management system will select, randomly or in a first in first out order or in a last in first out order, a first digital property piece from target bin number N. The system will remove the first digital property piece from the target bin and store it in a locked bin (not shown). Then the system compares the value U1 of the selected first digital property piece against transaction value T. If U1 is equal to or greater than T (U1>=T), the system will use this selected first digital property piece for the transaction. The system will update the content of the status indicator number N accordingly, if necessary. For example, as shown in FIG. 2, for the transaction value 120 whose target bin number is 6 (B_6), determined by taking the floor of the base 2 logarithm of 120, the system will select a first digital property piece from target bin number 6 if the status indicator number 6 indicates at least two digital property pieces are stored in bin number 6. If the selected first digital property piece has a value of 127 which is larger than transaction value 120, the selected first digital property piece will be used for the transaction.

If the value U1 of selected first digital property piece is smaller than the transaction value T, the system will select, randomly or in a first in first out order or in a last in first out order, a second digital property piece with value U2 from the target bin number N. The second selected digital property piece is removed from the bin number 6 and stored in a locked bin. The system then uses the selected first and second digital property pieces for the transaction. The status indicator number N is updated accordingly. For example, as shown in FIGS. 3A-B, if the status indicator number 6 shows 2 indicating at least 2 digital property pieces are stored in bin number 6, a first digital property piece with a value 120 is selected. Since the value of selected first digital property piece is 100, which is smaller than the transaction value 120, the system will select a second digital property piece with a value 65 and use both digital property pieces (respectively with value of 100 and 65) for the transaction.

If the status indicator number 6 shows 0 or 1, indicating the bin number 6 stores 0 or 1 digital property piece, the system will look for next higher level populated bin whose corresponding status indicator shows 1 or 2, indicating it stores at least 1 digital property piece. Thus, if the status indicator number N+1 shows 1 or 2, the system will select the first digital property piece from bin number N+1 for the transaction. If the status indicator number N+1 shows 0, the system will check the status indicator number N+2, until it finds a higher level status indicator (status indicator number N+A, A>=1) shows 1 or 2. The system will then select a first digital property piece from the bin number N+A for the transaction. After the first digital property piece is removed from the bin, the corresponding status indicator will be updated accordingly when necessary. For example, as shown in FIGS. 4A-B, for a transaction request at the transaction value 120, the system determines the target bin number 6 and checks its status indicator. Since the status indicator number 6 shows 1, indicating only 1 digital property piece is stored in bin number 6, the system checks the status indicator of higher level bins. Status indicator number 7 shows 0 and status indicator number 8 shows 1, the system selects a first digital property piece with a value 234 from bin number 8 for the transaction. Status indicator number 8 is then set to 0.

When the target bin stores less than 2 digital property pieces and all the higher level bins are empty, the system will first select the digital property piece stored in the target bin, if any, and then look for the next lower level bin until the system finds sufficient number of digital property pieces whose aggregate value is equal to or larger than the transaction value. The system will use all these digital property pieces for the transaction. The related status indicators will be updated accordingly when necessary. For example, as shown in FIGS. 5A-C, status indicator number 6 shows 1 and all higher level status indicators show 0, the system selects a first digital property with value 100 from bin number 6. The value 100 of the first digital property piece is smaller than the transaction value 120, the system then looks for bin number 5 whose status indicator shows 0. The system further looks for bin number 4 and finds its status indicator shows 2. Thus, the system selects a second digital property piece with value 18 from bin number 4. However, the sum of selected first and second digital property pieces (118=100+18) is still smaller than the transaction value 120. Since the status indicator number 4 remains to be 2 after the second digital property piece is removed, the system continues to select a third digital property piece with value 20 from the bit number 4. The sum of these 3 selected digital property pieces is 138, greater than the transaction value 120. The system then uses these 3 selected digital property pieces for the transaction.

If the sum of digital property pieces in all bin numbers is still smaller than the transaction value, the virtual wallet does not have sufficient funds to complete the transaction. The transaction fails.

In order for a digital property management system to avoid running out of digital property pieces in a specific bin (such as the target bin) whose value range is popular for daily transactions so that the specific bin becomes empty, the system can make some arrangements on changes trying to replenish such specific bin or its nearby bins.

After the digital property management system selects sufficient number of digital property pieces for the transaction (i.e. the sum S of the values of selected digital property pieces, which can comprise one, or two, or more digital property pieces, is equal to or greater than the transaction value T), the system calculates the original change value from the transaction. For the transaction request at a transaction value T, the original change value C1 is derived by subtracting the transaction value T from the aggregate value of selected digital property pieces S (C1=S−T). The system will then determine an original change bin, in which a digital property piece with the original change value should be stored, by taking the floor of the base 2 logarithm of the original change value C1. Based on the above calculation, the original change should be stored in bin number O.

If the original change bin number O is smaller than the target bin number N (i.e. bin number O is a lower level bin than bin number N), the system will select, randomly or in a first in first out order or in a last in first out order, an additional digital property piece at value C2 from the original change bin number O and add it to the input of the transaction. As a result, the actual transaction will generate an actual change at value C, which is the sum of C1 and C2. The newly generated digital property piece at the actual change value C should be stored in a bin number O+1, one level higher bin than the original change bin number O. Status indicator O+1 will be updated accordingly, if necessary. For example, as shown in FIGS. 6A-C, for a transaction request at a transaction value 6, the system determines the target bin number is bin number 2, by taking the floor of the base 2 logarithm of 6, and selects the first digital property piece at value 7 for the transaction. The original change value is 1 and the original change bin number is bin number 0. Since the original change bin number 0 is smaller than the target bin number 2, the system will then select an additional digital property piece at value 1 from the bin number 0 and add it to the input of the transaction. Thus, the actual change value is 2 and the newly generated digital property piece at the actual value 2 will be stored in bin number 1, one level higher bin than bin number 0.

If the original change bin number O is the same as the target bin number N, the system will simply store a newly generated digital property piece at the original change value C1 in bin number O without taking any additional action. For example, as shown in FIGS. 7A-C, for a transaction request at a transaction value 14, the system determines the target bin is bin number 3, by taking the floor of base 2 logarithm of 14, and selects both digital property pieces at values 11 and 12 from bin number 3 for the transaction. The original change value is 9 and the original change bin is also bin number 3. The original change bin number 3 is at the same level as the target bin number 3. The system will simply store the newly generated digital property piece at the original change value 9 in bin number 3.

If the original change bin number O is greater than the target bin number N. The system will break the original change value C1 into two equal actual change value C for the transaction. Thus, the actual transaction will generate two actual changes, each of which is at value C. The two newly generated digital property pieces are stored in the bin number O−1. For example, as shown in FIGS. 8A-C, for a transaction request at a transaction value 35, the system determines the target bin number is bin number 5, by taking the floor of the base 2 logarithm of 35, and selects the digital property piece at value 175 from bin number 7 for the transaction. The original change is at the value 140 and the original change bin number is bin number 7. The original change bin number 7 is at a higher level than the target bin number 5. The system breaks the original change value 140 into two equal actual change values, each of which is 70. The two newly generated digital property pieces are stored in bin number 6, one level lower than the original change bin number 7. In another example as shown in FIGS. 9A-C, for a transaction request at a transaction value 61, the system determines the target bin number is bin number 5, by taking the floor of the base 2 logarithm of 61, and selects the digital property piece at value 175 from bin number 7 for the transaction. The original change value is 114 and the original change bin number is bin number 6. The original change bin number 6 is greater than the target bin number 5. The system then breaks the original change value 114 into two equal actual change values, each of which is 57. The two newly generated digital property pieces at the actual change value 57 are stored in bin number 5, one level lower than original change bin number 6. In another embodiment, the system can break the original change value C1 into two different actual changes values.

Figure 11:
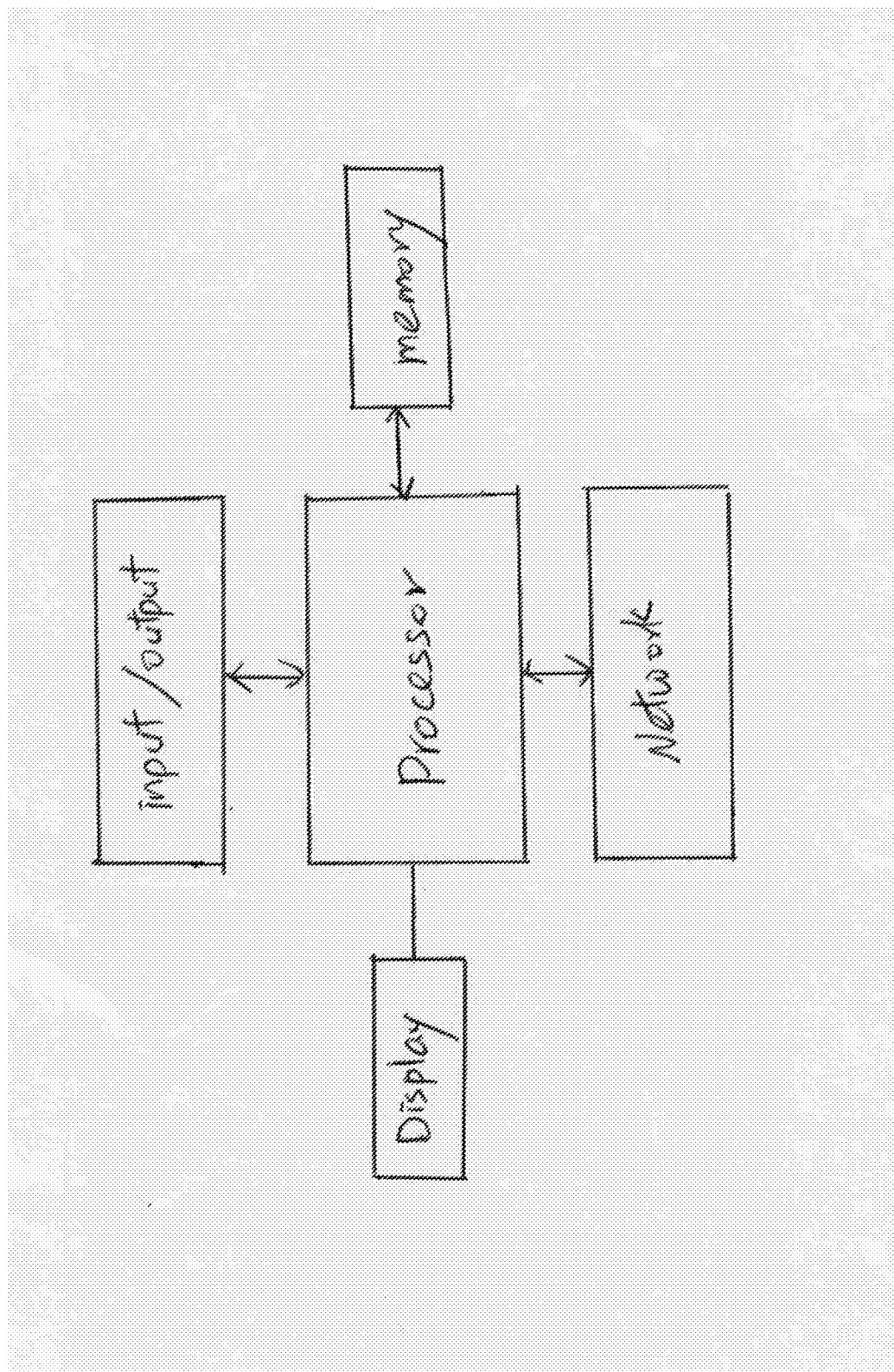
FIG. 11 is a block diagram illustrating an example node of the above network.

The above described methods can be implemented in any digital property management system where one or more digital property pieces need to be selected for a transaction. A digital property management system can comprise virtual wallets including virtual treasuries (a special type of virtual wallets used by digital property issuers), a digital property transaction system, and others. In one embodiment, as shown in FIG. 10, the digital property transaction system is a distributed transaction consensus network 100, referred to as TBCA (The BlockChain Alliance) Network in this disclosure, which is implemented to transact digital properties using cryptographic technology. TBCA System 100 comprises a plurality of nodes, including an administrator 110, digital property issuers 120, 130, 140, 150, miners 130, 140, 160, 170 and other nodes 180, 190. As shown in FIG. 11, each node usually comprises a processor to perform calculations and execute programs; a memory to store software, programs, and data; a display to communicate with users; an input/output component to communicate with users and other devices, and a network component to connect with network via wiring or wireless channels.

The administrator 110, referred to as TBCA in this disclosure, sets rules and manages the TBCA Network 100. The administrator 110 can admit a node to join the distributed transaction consensus network 100 (TBCA Network) and become a member of the network. In addition, the administrator 110 (TBCA) can authorize a digital property issuer 120-150 to issue various digital properties, such as digital currencies, digital securities, digital bonds, digital futures, and digital precious metals.

Figure 12:
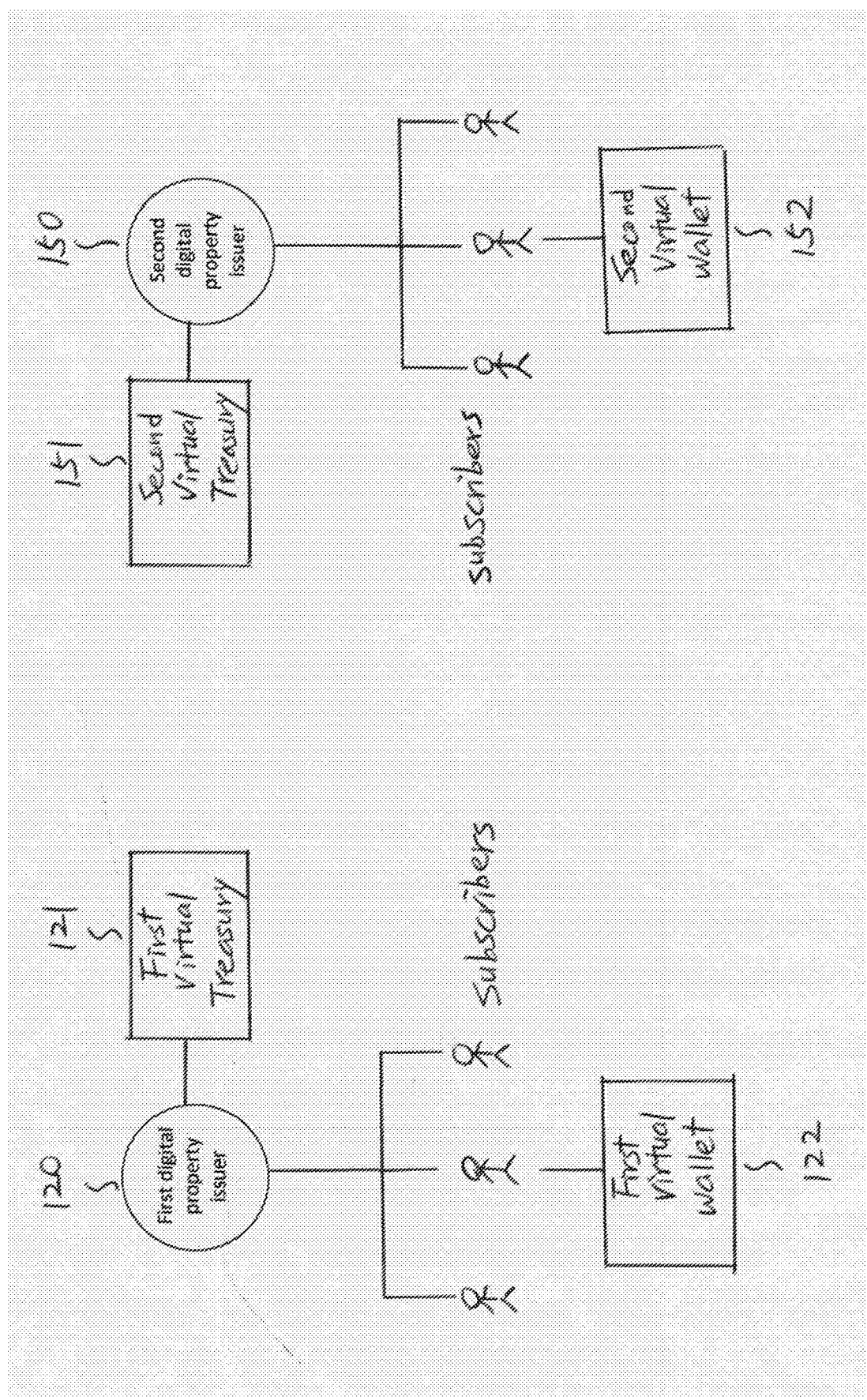
FIG. 12 is block diagram showing digital property issuers, virtual treasuries, subscribers, and virtual wallets.

A digital property issuer, e.g. 120, 150, can issue its own digital properties. In one embodiment, a digital property issuer can be a bank, e.g. Bank of American ("BOA") or Chase; an investment/trading institute, e.g. Fidelity or Goldman Sachs; or a telecom operator, e.g. AT&T Inc. (ATT), SoftBank Corp. (SBT), or Chunghwa Telecom. In one embodiment, a digital property can be any of digital currencies, digital securities, digital bonds, digital futures, digital precious metals or digital fee tokens. As shown in FIG. 12, the digital property issuer 120, 150 can respectively have a virtual treasury 121, 151 to store various digital properties issued by itself, other digital property issuers, or the administrator 110. Each virtual treasury has a virtual treasury ID, which in some embodiment can be the virtual treasury address. In addition, each virtual treasury has a public key and a private key. To spend the digital property stored in the virtual treasury, a digital property issuer has to use the private key associated with the virtual treasury to sign transactions. The methods and systems described in this description can be applied to digital property pieces stored in a virtual treasury, which is a special type of virtual wallet.

A miner 130, 140, 160, 170 can record validated transactions in a distributed ledger (open to a member/node of TBCA Network 100). A distributed ledger is essentially a digital property database or data structure that can be shared across a distributed transaction consensus network of multiple nodes in various sites, geographies or institutions. All nodes within the network can have their own identical copy of the ledger. Each transaction is recorded by a miner in a distributed ledger. Any changes to the ledger are reflected in all copies in minutes, or in some cases, seconds. The security and accuracy of the digital properties stored in the ledger are maintained cryptographically through the use of keys and signatures to control who can do what within the distributed ledger. In an embodiment, a blockchain data structure is used for a distributed ledger. A miner can create a new block to record validated transactions, and then propagate the new block to other nodes of the system. In one embodiment, each block is identified by a block hash, made by hashing the block header twice through the SHA256 cryptographic algorithm. In addition, each block is referenced back to a previous block, known as the parent block, through a "previous block hash" field in the block header. Thus, the sequence of hashes links each block to its parent to create a chain going back all the way to the first block ever created. As the blocks pile on top of each other, it becomes exponentially harder to reverse the transactions. Therefore, transactions recorded in the blocks become more and more trusted over the time. However, a distributed ledger can use any other data structure known to people with ordinary skill in the art.

Customers (referred to as "subscribers") of a digital property issuer can open and own one or more virtual wallets associated with the digital property issuer. Each virtual wallet has a virtual wallet ID, which in some embodiment can be the virtual wallet address. In addition, each virtual wallet has a public key and a private key. To spend the digital property stored in his or her virtual wallet, a subscriber has to use the private key associated with the virtual wallet to sign transactions. A subscriber can open and own virtual wallets at one or more digital property issuers. In one embodiment as shown in FIG. 12, a virtual wallet 122, 152 is provided to store, send, transfer, receive, and manage digital properties, including multiple types of digital assets, credits, and obligations, such as digital currencies, digital securities, digital bonds, digital futures, digital precious metals and digital fee tokens, for a subscriber, e.g. an individual, investor, and/or trader.

Each virtual wallet 122, 152 is respectively associated with a digital property issuer 120, 150, and can be identified by a virtual wallet ID (or address in some embodiment), e.g. 1F1tAaz5x1HUXrCNLbtMDqcw6o5GNn4xq and 16ULZUJwv1HZJkFrs8aa9c3xHTjiayyTNS. In one embodiment, a virtual wallet 122 can only store, send, receive, and manage various digital properties issued by the digital property issuer 120, with which the virtual wallet 122 is associated, rather than digital properties issued by other digital property issuers.

In one embodiment, a digital property piece, the fundamental building block of digital property managements in a distributed transaction consensus system, is represented by an unspent transaction output ("UTXO"). A UTXO is an indivisible chunk of digital property locked by a private key to a specific virtual wallet or virtual treasury and can be any arbitrary value. A customer's virtual wallet may comprise many UTXOs from hundreds of prior transactions recorded in hundreds of blocks. The customer can request a transaction to transfer a specific value of the digital property to a restaurant, e.g. to pay for a meal. The transaction may comprise one or more transaction inputs (input UTXO) from the customer's virtual wallet and one or more transaction outputs (output UTXO) to receiving virtual wallets, e.g. meal value to the restaurant and the change back to the customer. Transaction inputs are pointers to UTXO that are generated from prior transactions and never spent before. Transaction outputs are UTXO locked to receiving virtual wallets, which can be spent by their owners in the future. As a general rule, the sum of value of transaction inputs should be equal to the sum of value of transaction outputs. No value should be generated or lost in a regular digital property transaction.

In one embodiment, a customer's transaction request is sent to a wallet server which collects all necessary information and sends it to a middleware. The middleware constructs a raw transaction using the above described methods to select UTXOs and sends it back to the wallet server which then sends it to a key server for the customer's signature using his or her private key for the virtual wallet. Wallet server passes the signed transaction back to the middleware, which propagates the transaction to the TBCA Network 100. The wallet server, key server, and middleware are software to facilitate the implementation of a transaction. After receiving the transaction, nodes on the TBCA Network 100, including digital property issuers and miners, will independently verify and validate the transaction, and then add the validated transaction to the transaction pool. Each node independently validates every transaction using the same criteria before propagating it further. A miner will create a new block pulling the transactions from the transaction pool. After it verifies and validates the new block, the miner then propagates the new block to other nodes. After receiving the new block, the nodes on the TBCA Network 100 will independently verify and validate the new block using the same criteria. Once a node has validated a new block, it will then connect the new block to its existing blockchain. The node sends the committed transactions back to the middleware. The middleware finds the newly created UTXOs from the committed transactions and stores them in proper bins based on their values. Then, the new owners can spend the output UTXO from these transactions. Eventually, each full node on the TBCA Network 100 will have a copy of the same ledger, or blockchain, unless the TBCA Network 100 is attacked, disconnected, or failed. A consensus requiring that a plurality of nodes, each of which independently verifies the same transactions and/or blocks with the same criteria, reach an agreement on the distributed ledger is a mechanism to enhance the security of transactions. The more nodes a distributed transaction consensus system requires to reach a consensus, the more secured the system is. Whether a consensus is reached can be determined by various rules and/or algorithms known to skilled people in the art. In one embodiment, when forking occurs, a consensus can be reached by comparing the length (or depth) of blocks in the chain and the fork having a longer chain wins, such as by the algorithm adopted in Bitcoin system. The more computational power a miner or a group of miners collectively have, the more blocks they can generate under the proof of work approach. In other words, the blocks that are accepted by a miner or miners collectively having majority of computational power would become consensus later adopted by other nodes. In another embodiment, a consensus can be reached by a majority of miners. Thus, blocks that are validated by a majority of miners will be propagated to other nodes for verification and recording. As a distributed transaction consensus system, the TBCA Network 100 needs to reach a consensus on each transaction, which is then respectively recorded in the distributed ledger stored in a plurality of nodes.

In one embodiment, William wants to send 50 digital US Dollars from his virtual wallet associated with ATT in the U.S. to Steve's virtual wallet associated with Far EasTone (FET) in Taiwan. Both ATT and FET are digital property issuers. In this embodiment, William's virtual wallet can store only digital properties issued by ATT and Steve's virtual wallet can store only digital properties issued by FET. To complete this transaction, a 3-step (3-subtransaction) process is implemented so that Steve will receive digital US Dollars issued by FET ($USD.FET). These 3 subtransactions to complete the remittance transaction are collectively referred to as a transaction set. (Please note that each subtransaction can be considered as a transaction by the TBCA Network 100 in some circumstances.) The first step (first subtransaction) is that 50 digital US Dollars issued by ATT (50 $USD.ATT) at William's virtual wallet is transferred to ATT's virtual treasury. The second step (second subtransaction) is that ATT's virtual treasury transfers 50 digital US Dollars issued by FET (50 $USD.FET) to FET. The third step (third subtransaction) is that FET's virtual treasury transfers 50 digital US Dollars issued by FET (50 $USD.FET) to Steve's virtual wallet. In one embodiment, FIGS. 13A-D illustrate the UTXOs respectively stored in William's virtual wallet, ATT's virtual treasury, FET's virtual treasury, and Steve's virtual wallet before the transaction.

For the first subtransaction to transfer 50 digital US Dollars issued by ATT (50 $USD.ATT) from William's virtual wallet to ATT's virtual treasury, the digital property management system determines the target bin number N is bin number 5, by taking the floor of the base 2 logarithm of 50, the transaction value T. Floor ($Log_2$ 50)=bin number 5. Since the status indicator number 5 shows 2 indicating at least 2 UTXOs are stored in bin number 5, the system selects, in a first in first out (FIFO) order, the first UTXO at value 48 from the queue of bin number 5 of the $USD.ATT digital property type. Since 48 is smaller than 50, the system selects, in a FIFO order, the second UTXO at value 58 from the queue of the same bin number 5. The sum of the first and second UTXOs, 106, is greater than the transaction value 50. The system will use these two UTXOs for the first subtransaction. Since no more UTXO is left after the second UTXO is removed from bin number 5, the status indicator number 5 is set to 0. ATT treasury receives the UTXO at value 50 of $USD.ATT type. The original change value is 56 and the original change bin number is bin number 5, by taking the floor of the base 2 logarithm of the original change value 56. The original change bin number 5 is at the same level as the target bin number 5. Thus, the newly generated UTXO at the original change value 56 will be stored to bin number 5 to replenish UTXOs for the future transactions. The status indicator number 5 is set to 1. FIGS. 14A-D illustrate the UTXOs respectively stored in William's virtual wallet, ATT's virtual treasury, FET's virtual treasury, and Steve's virtual wallet after the first subtransaction.

For the second subtraction, since ATT's virtual treasury has more than 50 digital US Dollars issued by FET, to reduce the balance owed by FET to ATT, the system will as a priority select the type of digital US Dollars issued by FET for transfer. Since the status indicator number 5 of the $USD.FET type shows 1, indicating only 1 UTXO is stored in bin number 5 of the $USD.FET type, the system selects the first UTXO at value 214 from bin number 7, the next higher populated bin of $USD.FET type, for the second subtransaction. The status indicator number 7 of the $USD.FET type is set to 0. FET treasury receives the newly created UTXO at value 50 of $USD.FET type. The original change value is 164 and the original change bin number is bin number 7, determined by taking the floor of the base 2 logarithm of the original change value 164. The original change bin number 7 is at a level higher than the target bin number 5. Thus, the system breaks the original change value 164 into two equal actual change value at 82 for the transaction. Once the transaction is completed, the two newly generated digital property pieces at the equal actual change value 82 are at UTXOs will be stored in bin number 6, one level lower bin than the original change bin number 7. The status indicator number 6 of the $USD.FET type is set to 2. FIGS. 15A-D illustrate the UTXOs respectively stored in William's virtual wallet, ATT's virtual treasury, FET's virtual treasury, and Steve's virtual wallet after the second subtransaction.

To transfer 50 $USD.FET from FET's virtual treasury to Steve's virtual wallet, since the status indicator number 5 of $USD.FET type is set to 2 indicating at least 2 UTXOs are stored in bin number 5 of $USD.FET type, the system will select, in a FIFO order, a first UTXO at value 55 from bin number 5 of $USD.FET type. Since 55 is greater than the transaction value 50, the system will use the UTXO at value 55 from the queue of bin number 5 of $USD.FET type from FET's virtual treasury for the third subtransaction. Steve's virtual wallet receives the UTXO at value 50 of $USD.FET type. The original change value is 5 and the original change bin is bin number 2 of $USD.FET type, determined by taking the floor of the base 2 logarithm of the original change value 5. The original change bin number 2 is at a lower level than the target bin number 5. Thus, the system will select an additional UTXO at value 4 from the original change bin number 2 and add it to the input of the third subtransaction. As a result, the system will generate a new UTXO at the actual change value 9 and store it in bin number 3, one level higher bin than the original change bin number 2. FIGS. 16A-D illustrate the UTXOs respectively stored in William's virtual wallet, ATT's virtual treasury, FET's virtual treasury, and Steve's virtual wallet after the third subtransaction.

In the above remittance transaction, William transfers 50 $USD.ATT from his virtual wallet associated with ATT to Steve's virtual wallet associated with FET. To accomplish this remittance transaction, three subtransactions (a transaction set) must be validated and confirmed as a whole. If one subtransaction is rejected, all three subtransactions have to be rejected. FIGS. 17A-C illustrate the embodiment of the data structure of a remittance transaction and its transaction inputs and outputs. The first subtransaction has two input UTXOs from William's virtual wallet at value 106 of $USD.ATT type (FC of 20) and two output UTXOs, the first one at value 50 of $USD.ATT type (FC of 20) locked to ATT's virtual treasury and the second one (the change back to William) at value 56 of $USD.ATT type (FC of 20) locked to Willaim's virtual wallet. The second subtransaction has the input UTXO from ATT's virtual treasury at value 214 of $USD.FET type (FC of 10) and three output UTXOs, the first one at value 50 of $USD.FET type (FC of 10) locked to FET's virtual treasury, and the second and third output UTXOs (the change back to ATT) each at value 82 of $USD.FET type (FC of 10) locked to ATT's virtual treasury. The third subtransaction has two input UTXOs of $USD.FET type (FC of 10) from FET's virtual treasury and two output UTXOs. The first input UTXO is at value 55 and the second input UTXO is at value 4, both of $USD.FET type. The first output UTXO is at value 50 of $USD.FET type (FC of 10) locked to Steve's virtual wallet and the second output UTXO (change back to FET) at value 9 of $USD.FET type (FC of 10) locked to FET's virtual treasury. With all necessary information, the middleware constructs the 3 raw subtransactions and sends them to wallet server, which further passes them to key server for appropriate signatures. The wallet server sends the 3 signed subtransacions back to the middleware, which propagates them to the TBCA Network 100. A miner will verify and validate these 3 subtransactions, which will be written into a new block only if all three subtransactions are validated. The new block will then be propagated to other nodes, which will independently verify the new block using the same criteria. Eventually, each node's ledger will include this new block recording the remittance transaction. After the newly generated UTXO at value 50 of $USD.FET type is stored in bin number 5 of Steve's virtual wallet, Steve can spend the 50 digital US Dollars immediately.

Figure 18:
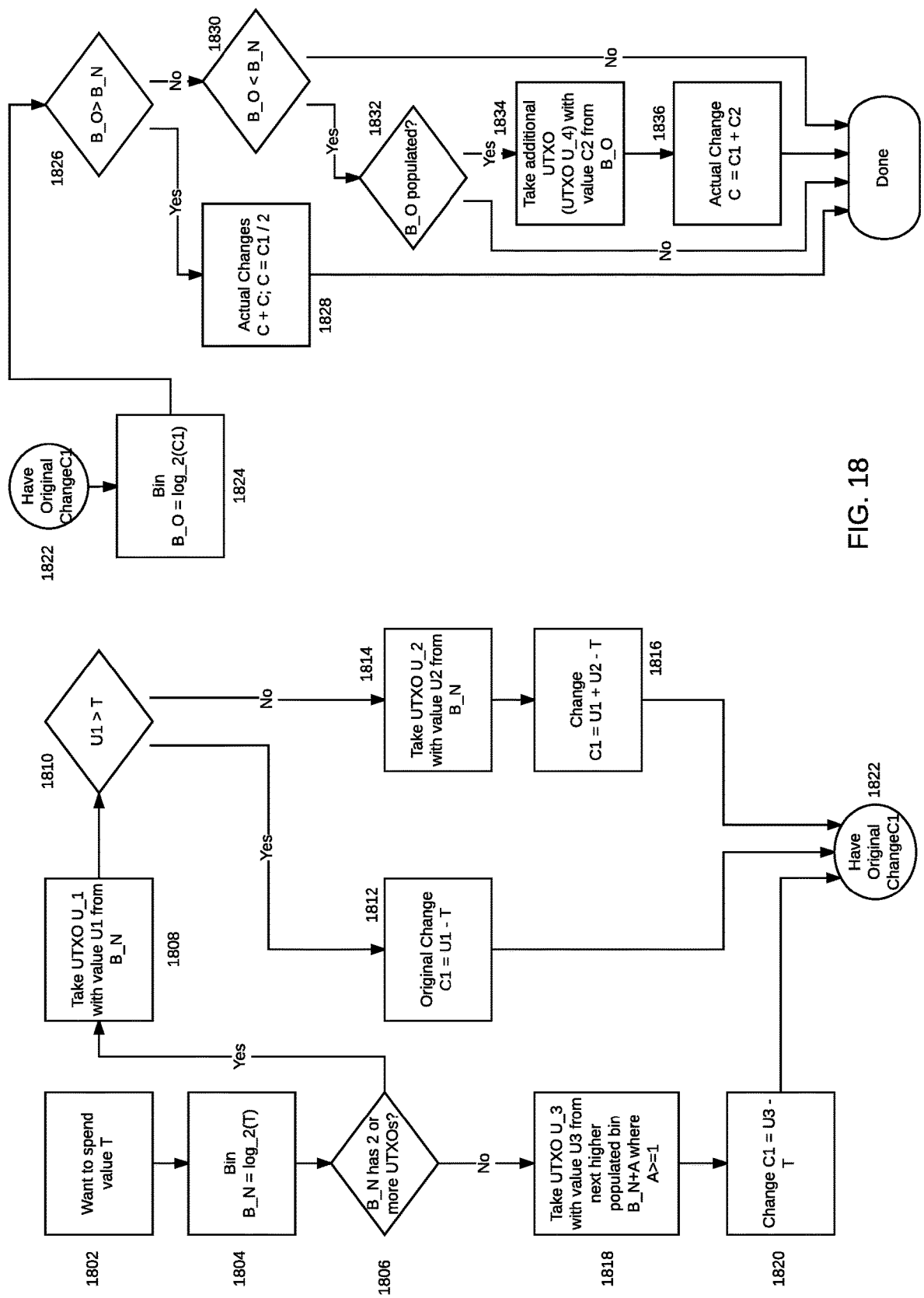
FIG. 18 is a flow chart illustrating an embodiment of a system selecting digital property pieces for a transaction and arranging changes therefrom.

FIG. 18 is one embodiment of the flow chart illustrating the steps to select UTXO(s) and the steps to break or converge original change values in various situations when the predetermined based number is 2. For a transaction request at a transaction value T received by a virtual wallet at step 1802, a digital property management system will first determine the target bin number N (B_N) at step 1804, by taking the floor of the base 2 logarithm of the transaction value T. At step 1806, the system determines whether the status indicator corresponding to the target bin number N indicates two or more UTXOs are stored in the target bin. If yes, at step 1808, the system selects a first UTXO U_1 with value U1 from the bin number N. At step 1810, the system determines whether U1>=T. If U1>=T, at step 1812, the system uses UTXO U_1 as the input UTXO for the transaction. The original change C1 has value U1-T (i.e. C1=U1-T). If U1<T, at step 1814, the system selects a second UTXO U_2 with value U2 from the bin number N. At step 1816, the original change C1 is calculated to be U1+U2-T (C1=U1+U2-T). If the status indicator number N indicates that target bin number N stores less than 2 UTXOs, at step 1818, the system selects UTXO U_3 with value U3 from a higher level populated bin, bin number N+A (B_N+A) where A is an integer equal to or larger than 1. The original change C1 has value U3-T (i.e. C1=U3-T).

For the original change with value C1, at step 1824, the system determines the original change bin number O (B_O) by taking the floor of the base 2 logarithm of the original change value C1. At step 1826, the system determines whether the original change bin number O (B_O) is greater than the target bin number N (B_N). If yes, at step 1828, the system breaks the original change value into two equal actual change value C=(C1)/2. If no, at step 1830, the system determines whether the original change bin number O (B_O) is smaller than the target bin number N (B_N). If yes, at step 1832, the system determines whether bin number O is populated (status indicator number O indicates at least one UTXO is stored in the bin number O)? If yes, the system selects an additional UTXO U_4 with value C2 from original change bin number O (B_O) and add it to input UTXO of the transaction. At step 1836, the actual change value C is calculated to be value C1+C2 (i.e. C=C1+C2). If the original change bin number O (B_O) is the same as the target bin number N (B_N), the system will store the newly generated UTXO with the original change value C1 in bin number O (B_O) as the actual change after the transaction is completed.

The Table 1 below illustrates one embodiment of pseudocode implementation for the process flow described in FIG. 18.

TABLE 1

```
Pseudocode Implementation
Spend(T):
    Outputs.Add(T)
    B_N = log_2(T)
    If HasMoreThanOneUTXO(B_N):
        U_1 = TakeUTXOFrom(B_N)
        If ValueOf(U_1) >= T:
            C1 = ValueOf(U_1) - X
            Selected.Add(U_1)
        Else:
            U_2 = TakeUTXOFrom(B_N)
            C1 = ValueOf(U_1) + ValueOf(U_2) - T
            Selected.Add(U_1, U_2)
    Else
        B_N+A = FindNextHigherPopulatedBin(B_N)
        U_3 = TakeUTXOFrom(B_N+A)
        C1 = ValueOf(U_3) - T
        Selected.Add(U_3)
    B_C1 = log_2(C1)
    If B_O > B_N:
        C_1 = C1/2
```

TABLE 1-continued

```
            C_2 = C1/2
            Outputs.Add(C_1, C_2)
        Else If B_O < B_N:
            If BinPopulated(B_O):
                U_4 = TakeUTXOFrom(B_O)
                C = ValueOf(U_4) + C1
                Outputs.Add(C)
            Else:
                C=C1
                Outputs.Add(C)
        Else:
            C=C1
            Outputs.Add(C)
    ConstructTransaction(Selected, Outputs)
```

Figure 19:
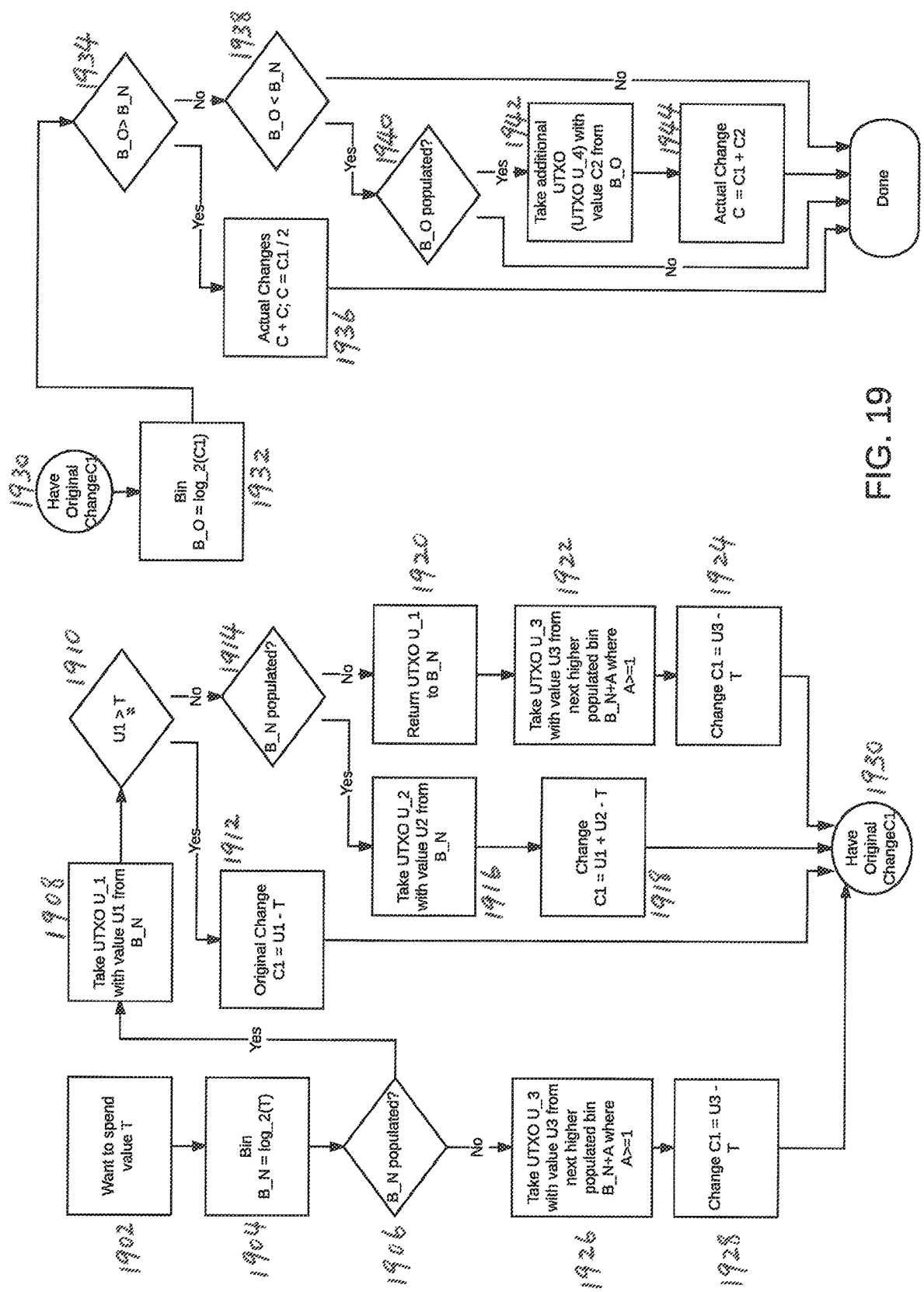
FIG. 19 is a flow chart illustrating another embodiment of a system selecting digital property pieces for a transaction and arranging changes therefrom.

FIG. 19 is another embodiment of the flow chart illustrating the steps to select UTXO(s) and the steps to break or converge changes in various situations when the predetermined base number is 2. For a transaction request at a transaction value T received by a virtual wallet at step 1902, a digital property management system will first determine the target bin number N (B_N) at step 1904, by taking the floor of the base 2 logarithm of the transaction value T. At step 1906, the system determines whether the status indicator corresponding to the target bin number N indicates at least one UTXO is stored in the target bin. If yes, at step 1908, the system selects a first UTXO U_1 with value U1 from the bin number N. At step 1910, the system determines whether U1>=T. If U1>=T, at step 1912, the system uses UTXO U_1 as the input UTXO for the transaction. The original change C1 has value U1-T (i.e. C1=U1-T). If U1<T, at step 1914, the system determines whether target bin number N is still populated after UTXO U_1 is removed from the bin by checking the status indicator number N. If bin number N is still populated, at step 1916, the system selects a second UTXO U_2 with value U2 from the bin number N. At step 1918, the original change C1 is calculated to be value U1+U2-T (i.e. C1=U1+U2-T). If the status indicator number N indicates bin number N is empty, at step 1920, the system returns the UTXO U_1 to the target bin and looks for a next higher populated bin by checking the status indicators at higher level than status indicator number N. At step 1922, the system selects a UTXO U_3 with value U3 from a next higher populated bin, bin number N+A (B_N+A) where A is an integer equal to or larger than 1. At step 1924, the original change C1 is calculated to have value U3-T (i.e. C1=U3-T).

For the original change with value C1, at step 1832, the system determines the original change bin number O (B_O) by taking the floor of the base 2 logarithm of the original change value C1. At step 1934, the system determines whether the original change bin number O (B_O) is greater than the target bin number N (B_N). If yes, at step 1936, the system breaks the original change value into two equal actual change value C=(C1)/2. If no, at step 1938, the system determines whether the original change bin number O (B_O) is smaller than the target bin number N (B_N). If yes, at step 1940, the system determines whether bin number O is populated (i.e. whether status indicator number O indicates at least one UTXO is stored in the bin number O)? If yes, at step 1942, the system selects an additional UTXO U_4 with value C2 from original change bin number O (B_O) and add it to input UTXO of the transaction. At step 1944, the actual change value C is calculated to be C1+C2 (i.e. C=C1+C2). If the original change bin number O (B_O) is the same as the target bin number N (B_N), the system will store the newly generated UTXO with the original change value C1 in bin number O (B_O) as the actual change after the transaction is completed.

The Table 2 below illustrates another embodiment of pseudocode implementation for the process flow described in FIG. 19.

TABLE 2

```
Pseudocode Implementation
Spend(T):
    Outputs.Add(T)
    B_N = log_2(T)
    If BinPopulated(B_N):
        U_1 = TakeUTXOFrom(B_N)
        If ValueOf(U_1) >= T:
            C1 = ValueOf(U_1) - T
            Selected.Add(U_1)
        Else:
            If BinPopulated(B_N):
                U_2 = TakeUTXOFrom(B_N)
                C1 = ValueOf(U_1) + ValueOf(U_2) - T
                Selected.Add(U_1, U_2)
            Else:
                PutUTXOInBin(U_1, B_N)
                B_N+A = FindNextHigherPopulatedBin(B_N+A)
                U_3 = TakeUTXOFrom(B_N+A)
                C1 = ValueOf(U_3) - T
                Selected.Add(U_3)
    Else:
        B_N+A = FindNextHigherPopulatedBin(B_N+A)
        U_3 = TakeUTXOFrom(B_N+A)
        C1 = ValueOf(U_3) - T
        Selected.Add(U_3)
    B_O = log_2(C1)
    If B_O > B_N:
        C_1 = C1/2
        C_2 = C1/2
        Outputs.Add(C_1, C_2)
    Else If B_O < B_N:
        If BinPopulated(B_O):
            U_4 = TakeUTXOFrom(B_O)
            C = ValueOf(U_4) + C1
            Outputs.Add(C)
        Else:
            C = C1
            Outputs.Add(C)
    Else:
        C = C1
        Outputs.Add(C)
    ConstructTransaction(Selected, Outputs)
```

In another embodiment where the ceiling of the predetermined base number is 3 (for example, the base number can be 2.5, 2.8, or 3), a transaction request can be completed by up to 3 digital property pieces from the target bin. After a plurality of bins are defined and digital property pieces are populated in the proper bins, to initiate the selection of digital property pieces for a transaction, a virtual wallet receives a transaction request at a transaction value T. The digital property management system then determines the target bin (B_N), in which a digital property piece at the transaction value T is designated to store, by taking the floor of the base 3 logarithm of the transaction value T. Floor ($Log_3$ T)=target bin number N. If the content of corresponding status indicator number N is 3 indicating that bin number N (B_N) stores at least three digital property pieces, the digital property management system will select, randomly or in a first in first out order or in a last in first out order, a first digital property piece from target bin number N. The system will remove the first digital property piece from the target bin and store it in a locked bin (not shown). Then the system compares the value U1 of the first selected digital property piece against transaction value T. If U1 is equal to or greater than T (U1>=T), the system will use this first digital property piece for the transaction. The system will update the content of the status indicator number N accordingly, if necessary.

If the value U1 of selected first digital property piece is smaller than the transaction value T, the system will select, randomly or in a first in first out order or in a last in first out order, a second digital property piece with value U2 from the target bin number N. The second selected digital property piece is removed from the target bin and stored in a locked bin. The system then determines whether the aggregate value of the first and the second digital property pieces is equal to or greater than the transaction value T. If yes, the system will use the first and the second digital property pieces for the transaction. If no, the system will select, randomly or in a first in first out order or in a last in first out order, a third digital property piece with value U3 from the target bin number N and then uses the selected first, second, and third digital property pieces for the transaction. The status indicator number N is updated accordingly, if necessary.

If the status indicator number N shows 0, 1 or 2, indicating the target bin stores less than 3 digital property pieces, the system will look for next higher level populated bin whose corresponding status indicator shows 1 or more, indicating it stores at least 1 digital property piece. Thus, if the status indicator number N+1 shows at least 1, the system will select the first digital property piece from bin number N+1 for the transaction. If the status indicator number N+1 shows 0, the system will check the status indicator number N+2 and the higher ones, until it finds a higher level status indicator (status indicator number N+A, A>=1) shows at least 1. The system will then select a first digital property piece from the bin number N+A for the transaction. After the first digital property piece is removed from the bin, the corresponding status indicator will be updated accordingly when necessary.

When the target bin stores less than 3 digital property pieces and all the higher level bins are empty, the system will first select the digital property pieces stored in the target bin, if any, and then look for the next lower level bins until the system finds sufficient number of digital property pieces whose aggregate value is equal to or larger than the transaction value. The system will then use all these digital property pieces for the transaction. The related status indicators will be updated accordingly when necessary.

It will be apparent to those skilled in the art that various modification and variations, and combination of various embodiments can be made in the digital property management system of the present invention without departing from the spirit or scope of the invention. Thus, it is intended that the present invention cover modifications and variations that come within the scope of the appended claims and their equivalents.

What is claimed is:

1. A method for storing and selecting digital property pieces for transactions in a digital property management system, comprising:
    (a) defining a plurality of bins for storing digital property pieces in memory,
    wherein (1) the bins are arranged in a low to high level order, (2) each bin is allocated to store digital property pieces each of which has a value within a right-open interval from a lower limit continuously to an upper limit, (3) the upper limit of a given bin equals to the lower limit of a next higher level bin, and (4) the upper limit of a given bin equals to its lower limit multiplied by a predetermined base number larger than one;
    (b) receiving, by a virtual wallet, a transaction request at a transaction value;
    (c) determining a target bin in which a digital property piece at the transaction value is designated to store;
    (d) if the target bin contains at least a predetermined minimum number of digital property pieces, selecting no more than a ceiling of the base number of digital property pieces from the target bin, wherein the aggregate value of the selected digital property pieces is not smaller than the transaction value, for the transaction, wherein the predetermined minimum number is an integer ranging from one to the ceiling of the predetermined base number;
    (e) otherwise, selecting a first digital property piece from a higher level populated bin for the transaction.

2. The method of claim 1,
    wherein in step (a), the ceiling of the predetermined base number is two; and
    wherein step (d) comprises:
    if the target bin contains at least two digital property pieces, selecting a first digital property piece from the target bin, and performing one of the following two steps:
    (d1) if a value of the first digital property piece is not smaller than the transaction value, using the first digital property for the transaction;
    (d2) if a value of the first digital property piece is smaller than the transaction value, selecting a second digital property piece from the target bin, and using the first and the second digital property pieces for the transaction.

3. The method of claim 2, wherein the first digital property piece is removed from the target bin and stored in a locked bin after the first digital property piece is selected; and the second digital property piece is removed from the target bin and stored in the locked bin after the second digital property piece is selected.

4. The method of claim 2, further comprising:
    deleting the digital property piece stored in the locked bin when the transaction is completed.

5. The method of claim 2, further comprising:
    (f) deriving an original change value by subtracting the transaction value from an aggregate value of selected digital property pieces for the transaction; and
    (g) determining an original change bin, in which a digital property piece at the original change value is designated to store.

6. The method of claim 5, further comprising:
    (h) if the original change bin is higher than the transaction bin, breaking the original change value into two actual change values and using the two actual change values for the transaction.

7. The method of claim 5, further comprising:
    (i) if the original change bin is lower than the transaction bin, selecting an additional digital property piece from the original change bin for the transaction.

8. The method of claim 6, further comprising:
    (i) if the original change bin is lower than the transaction bin, selecting an additional digital property piece from the original change bin for the transaction.

9. The method of claim 1, wherein in step (e), the higher level populated bin is a next higher level populated bin.

10. The method of claim 1, wherein the virtual wallet can access a plurality of status indicators in memory and each status indicator corresponds to a bin to indicate the number of digital property pieces stored in the bin.

11. The method of claim 10, wherein the status indicator comprises one bit to indicate whether the corresponding bin is empty.

12. The method of claim 10, wherein the status indicator comprises two bits to indicate whether the corresponding bin stores 0, 1, or at least 2 digital property pieces.

13. The method of claim 10, further comprising:
updating the status indicator if a digital property piece is removed from or stored in the corresponding bin.

14. The method of claim 1, wherein the digital property piece in the bin is selected randomly, in a first in first out order, or in a last in first out order.

15. The method of claim 1, further comprising:
storing a newly generated digital property piece in a designated bin based on a value of the newly generated digital property piece when a transaction is completed.

16. The method of claim 1, wherein the transaction is completed by a distributed transaction consensus network.

17. The method of claim 16, wherein the digital property pieces stored in the bins are synchronized with digital property pieces stored in the distributed transaction consensus network.

18. The method of claim 16, wherein the plurality of bins to store digital property pieces are shared by the virtual wallet and the distributed transaction consensus network.

19. The method of claim 16, wherein the digital property piece comprises unspent transaction output (UTXO).

20. The method of claim 1,
wherein in step (a), the ceiling of the predetermined base number is two; and
wherein step (d) comprises:
if the target bin contains at least one digital property piece, selecting and removing a first digital property piece from the target bin, and performing one of the following two steps;
(c1) if a value of the first digital property piece is not smaller than the transaction value, using the first digital property for the transaction;
(c2) if a value of the first digital property piece is smaller than the transaction value, performing one of the following two steps:
(c21) if the target bin contains at least one digital property piece, selecting and removing a second digital property piece from the target bin, and using the first and the second digital property pieces for the transaction;
(c22) if the target bin is empty, returning the first digital property piece back to the target bin and performing step (e).

21. The method of claim 1, wherein in step (a), the ceiling of the predetermined base number is three, four, five, or six.

22. The method of claim 1,
wherein in step (a), the ceiling of the predetermined base number is three; and
wherein step (d) comprises:
if the target bin contains at least three digital property pieces, selecting a first digital property piece from the target bin, and performing one of the following two steps:
(d1) if a value of the first digital property piece is not smaller than the transaction value, using the first digital property for the transaction;
(d2) if a value of the first digital property piece is smaller than the transaction value, selecting a second digital property piece from the target bin, and performing one of the following steps:
(d21) if an aggregate value of the first and the second digital property pieces is not smaller than the transaction value, using the first and the second digital property pieces for the transaction;
(d22) if an aggregate value of the first and the second digital property pieces is smaller than the transaction value, selecting the third digital property piece from the target bin, and using the first, the second, and the third digital property pieces for the transaction.

23. A computer program product comprising one or more computer usable non-transitory media having computer readable program code embedded therein for controlling a digital property management system, the computer readable program code configured to cause the digital property management system to execute a transaction process, the process comprising:
(a) defining a plurality of bins for storing digital property pieces in memory,
wherein (1) the bins are arranged in a low to high level order, (2) each bin is allocated to store digital property pieces each of which has a value within a right-open interval from a lower limit continuously to an upper limit, (3) the upper limit of a given bin equals to the lower limit of a next higher level bin, and (4) the upper limit of a given bin equals to its lower limit multiplied by a predetermined base number larger than one;
(b) receiving, by a virtual wallet, a transaction request at a transaction value;
(c) determining a target bin in which a digital property piece at the transaction value is designated to store;
(d) if the target bin contains at least a predetermined minimum number of digital property pieces, selecting no more than a ceiling of the base number of digital property pieces from the target bin, wherein the aggregate value of the selected digital property pieces is not smaller than the transaction value, for the transaction, wherein the predetermined minimum number is an integer ranging from one to the ceiling of the predetermined base number;
(e) otherwise, selecting a first digital property piece from a higher level populated bin for the transaction.

24. The computer program product of claim 23,
wherein in step (a), the ceiling of the predetermined base number is two; and
wherein step (d) comprises:
if the target bin contains at least one digital property piece, selecting and removing a first digital property piece from the target bin, and performing one of the following two steps;
(c1) if a value of the first digital property piece is not smaller than the transaction value, using the first digital property for the transaction;
(c2) if a value of the first digital property piece is smaller than the transaction value, performing one of the following two steps:
(c21) if the target bin contains at least one digital property piece, selecting and removing a second digital property piece from the target bin, and using the first and the second digital property pieces for the transaction;
(c22) if the target bin is empty, returning the first digital property piece back to the target bin and performing step (e).

25. The method of claim 1, wherein
in the step (a) the lower limit and the upper limit of the right-open interval are $X^Y$ and $X^{Y+1}$ respectively where X is a base larger than 1 and Y is an integer beginning from 0 and increasing by 1 for a next higher level bin, with a lowest level bin storing digital property pieces each of which has a value ranging from $X^0$ to less than $X^1$ (1 to X);

in the step (c) the target bin is determined by taking a floor of logarithm with the base X of the transaction value; and in the step (d) the predetermined minimum number is an integer ranging from one to a ceiling of the base X.

26. The method of claim 25, wherein the ceiling of the base X is two; and wherein step (d) comprises:

if the target bin contains at least two digital property pieces, selecting a first digital property piece from the target bin, and performing one of the following two steps:

(d1) if a value of the first digital property piece is not smaller than the transaction value, using the first digital property for the transaction;

(d2) if a value of the first digital property piece is smaller than the transaction value, selecting a second digital property piece from the target bin, and using the first and the second digital property pieces for the transaction.

* * * * *